(12) United States Patent
Corbett et al.

(10) Patent No.: US 12,399,099 B2
(45) Date of Patent: *Aug. 26, 2025

(54) PARTICLE CHARACTERIZATION

(71) Applicant: Malvern Panalytical Limited, Malvern (GB)

(72) Inventors: Jason Corbett, Malvern (GB); Alex Malm, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 11 days.

This patent is subject to a terminal disclaimer.

(21) Appl. No.: 18/491,034

(22) Filed: Oct. 20, 2023

(65) Prior Publication Data

US 2024/0192108 A1    Jun. 13, 2024

Related U.S. Application Data

(63) Continuation of application No. 17/531,021, filed on Nov. 19, 2021, now Pat. No. 11,906,412, which is a
(Continued)

(30) Foreign Application Priority Data

Mar. 23, 2017 (EP) .................... 17162676

(51) Int. Cl.
*G01N 15/02* (2024.01)
*G01N 15/0205* (2024.01)

(52) U.S. Cl.
CPC . *G01N 15/0211* (2013.01); *G01N 2015/0222* (2013.01)

(58) Field of Classification Search
CPC ....... G01N 15/1427; G01N 2015/0096; G01N 2015/0038; G01N 2015/0053
(Continued)

(56) References Cited

U.S. PATENT DOCUMENTS 3,621,220 A    11/1971  Ford, Jr.
4,074,939 A     2/1978  Rabl
(Continued)

FOREIGN PATENT DOCUMENTS

CN    1502981 A    6/2004
CN  101072997 A   11/2007
(Continued)

OTHER PUBLICATIONS

Office Action dated Nov. 2, 2023, directed to US Reexamination Application No. 90/019,205; 40 pages.
(Continued)

*Primary Examiner* — Isiaka O Akanbi
(74) *Attorney, Agent, or Firm* — Morrison & Foerster LLP

(57) ABSTRACT

A method of characterising particles in a sample, comprising: obtaining a scattering measurement comprising a time series of measurements of scattered light from a detector, the scattered light produced by the interaction of an illuminating light beam with the sample; producing a corrected scattering measurement, comprising compensating for scattering contributions from contaminants by reducing a scattering intensity in at least some time periods of the scattering measurement; determining a particle characteristic from the corrected scattering measurement.

16 Claims, 16 Drawing Sheets

Related U.S. Application Data continuation of application No. 16/496,027, filed as application No. PCT/EP2018/057033 on Mar. 20, 2018, now Pat. No. 11,199,486.

(58) Field of Classification Search
USPC .............................. 356/338, 339, 336, 436
See application file for complete search history.

(56) References Cited

U.S. PATENT DOCUMENTS

| | | | |
|---|---|---|---|
| 4,178,917 A | 12/1979 | Shapiro | |
| 4,473,296 A | 9/1984 | Shofner et al. | |
| 4,537,861 A | 8/1985 | Elings et al. | |
| 4,676,641 A | 6/1987 | Bott | |
| 4,690,561 A | 9/1987 | Ito | |
| 4,710,025 A | 12/1987 | Wyatt et al. | |
| 4,781,460 A | 11/1988 | Bott | |
| 4,975,237 A | 12/1990 | Brown | |
| 5,166,052 A | 11/1992 | Cercek | |
| 5,576,827 A | 11/1996 | Strickland et al. | |
| 5,956,139 A | 9/1999 | Meyer et al. | |
| 6,016,193 A | 1/2000 | Freeman et al. | |
| 6,016,195 A | 1/2000 | Peters | |
| 6,052,184 A | 4/2000 | Reed | |
| 6,100,976 A | 8/2000 | Ackerson | |
| 6,509,161 B1 | 1/2003 | Barker et al. | |
| 7,119,900 B2 * | 10/2006 | Okumura | G01N 15/0211 356/364 |
| 7,820,260 B2 | 10/2010 | Maggioni | |
| 8,729,502 B1 | 5/2014 | Klotzkin | |
| 8,854,621 B1 * | 10/2014 | Muschol | G01N 21/51 356/336 |
| 9,341,559 B2 | 5/2016 | Carr et al. | |
| 10,006,851 B2 | 6/2018 | McNeil-Watson et al. | |
| 10,197,485 B2 | 2/2019 | Corbett et al. | |
| 10,359,361 B2 | 7/2019 | Nadkarni et al. | |
| 10,365,198 B2 | 7/2019 | Corbett et al. | |
| 11,187,638 B2 | 11/2021 | Corbett | |
| 2004/0011975 A1 * | 1/2004 | Nicoli | G01N 15/0227 250/574 |
| 2005/0013746 A1 | 1/2005 | Lee et al. | |
| 2005/0179904 A1 | 8/2005 | Larsen et al. | |
| 2007/0206203 A1 | 9/2007 | Trainer | |
| 2007/0229823 A1 | 10/2007 | Sung et al. | |
| 2008/0079939 A1 | 4/2008 | Fiolka et al. | |
| 2008/0221814 A1 | 9/2008 | Trainer | |
| 2009/0073456 A1 | 3/2009 | Wax et al. | |
| 2010/0238436 A1 | 9/2010 | Havard | |
| 2011/0090500 A1 | 4/2011 | Hu et al. | |
| 2012/0008143 A1 | 1/2012 | Ihlefeld | |
| 2012/0044493 A1 * | 2/2012 | Smart | G01N 15/1434 356/336 |
| 2012/0281215 A1 * | 11/2012 | Peters | G01N 21/51 356/343 |
| 2013/0218519 A1 | 8/2013 | Tochino | |
| 2013/0320216 A1 * | 12/2013 | Aiko | H01M 4/139 250/349 |
| 2014/0050619 A1 | 2/2014 | Meller | |
| 2014/0226158 A1 * | 8/2014 | Trainer | G01J 3/0218 356/336 |
| 2016/0202164 A1 | 7/2016 | Trainer | |
| 2016/0252443 A1 | 9/2016 | Spriggs | |
| 2017/0102329 A1 | 4/2017 | Corbett | |
| 2017/0248510 A1 | 8/2017 | Pedrono et al. | |
| 2017/0307495 A1 | 10/2017 | Corbett et al. | |
| 2017/0322133 A1 | 11/2017 | Trainer | |
| 2018/0188148 A1 | 7/2018 | Trainer | |
| 2018/0231448 A1 | 8/2018 | Moenkemoeller | |
| 2018/0236452 A1 | 8/2018 | Corbett | |
| 2018/0266931 A1 | 9/2018 | Corbett et al. | |
| 2018/0275038 A1 | 9/2018 | Cantin | |
| 2019/0078990 A1 | 3/2019 | Corbett | |
| 2019/0234852 A1 | 8/2019 | Scullion et al. | |
| 2019/0242805 A1 | 8/2019 | Corbett et al. | |
| 2019/0317002 A1 | 10/2019 | Corbett et al. | |
| 2019/0383719 A1 | 12/2019 | Corbett et al. | |
| 2020/0025665 A1 | 1/2020 | Trainer | |
| 2020/0292436 A1 | 9/2020 | Jobert | |
| 2021/0208047 A1 | 7/2021 | Corbett et al. | |

FOREIGN PATENT DOCUMENTS

| | | |
|---|---|---|
| CN | 101118210 A | 2/2008 |
| CN | 101477023 A | 7/2009 |
| CN | 102066901 A | 5/2011 |
| CN | 202275041 U | 6/2012 |
| CN | 202453283 U | 9/2012 |
| CN | 103069265 A | 4/2013 |
| CN | 103257097 A | 8/2013 |
| CN | 103585940 A | 2/2014 |
| CN | 103608671 A | 2/2014 |
| CN | 104662407 A | 5/2015 |
| EP | 1291642 A1 | 3/2003 |
| EP | 2365313 A1 | 9/2011 |
| EP | 2869054 A1 | 5/2015 |
| EP | 3379232 A1 | 9/2018 |
| JP | H1-503178 A | 10/1989 |
| JP | H2-228069 A | 9/1990 |
| JP | H5-172730 B2 | 7/1993 |
| JP | H6-317513 | 11/1994 |
| JP | 2002-71567 A | 3/2002 |
| JP | 2002-196222 A | 7/2002 |
| JP | 2002-341173 A | 11/2002 |
| JP | 2006-71497 A | 3/2006 |
| JP | 2011-59048 A | 3/2011 |
| JP | 2014-518379 A | 7/2014 |
| JP | 2016-26301 A | 2/2016 |
| WO | 89/00286 A1 | 1/1989 |
| WO | 96/22521 A1 | 7/1996 |
| WO | 03/023375 A2 | 3/2003 |
| WO | 2005/091970 A2 | 10/2005 |
| WO | 2007/126389 A1 | 11/2007 |
| WO | 2008/092272 A1 | 8/2008 |
| WO | 2009/090562 A2 | 7/2009 |
| WO | 2012/172330 A1 | 12/2012 |
| WO | 2014/065694 A1 | 5/2014 |
| WO | 2017/051149 A1 | 3/2017 |
| WO | 2018/172362 A1 | 9/2018 |
| WO | 2018162869 A1 | 9/2018 |

OTHER PUBLICATIONS

"Zetasizer Nano Series," (Aug. 2009) User Manual published by Malvern; 308 pages.

Brookhaven Instruments Corporation. (Jan. 1995). "Instruction Manual for 90Plus/BI-MAS Multi Angle Particle Sizing Option," Catalog No. MASMA, Ver. 1.0; 74 pages.

Corbett et al., U.S. Office Action dated Dec. 7, 2020, directed to U.S. Appl. No. 16/496,027; 10 pages.

Corbett et al., (2012). "Measuring surface zeta potential using phase analysis light scattering in a simple dip cell arrangement", Colloids and Surfaces A: Physiochemical and Engineering Aspects 396: 169-176.

Corbett et al., U.S. Notice of Allowance dated Jan. 12, 2021, directed to U.S. Appl. No. 16/558,763; 11 pages.

Corbett et al., U.S. Office Action dated Apr. 21, 2021, directed to U.S. Appl. No. 16/496,027; 11 pages.

Corbett et al., U.S. Office Action dated Dec. 9, 2021, directed to U.S. Appl. No. 17/102,038; 11 pages.

Corbett et al., U.S. Office Action mailed Nov. 29, 2019, directed to U.S. Appl. No. 16/414,961; 6 pages.

Corbett, Office Action dated Aug. 12, 2022, directed to U.S. Appl. No. 17/355,430; 25 pages.

Corbett, Office Action dated Nov. 30, 2022, directed to U.S. Appl. No. 17/355,430; 25 pages.

Corbett et al., U.S. Office Action dated Feb. 16, 2023, directed to U.S. Appl. No. 17/531,021; 10 pages.

Corbett, U.S. Office Action dated Mar. 31, 2020 directed to U.S. Appl. No. 16/085,169; 19 pages.

(56) References Cited

OTHER PUBLICATIONS

Corbett, U.S. Office Action dated Oct. 8, 2020, directed to U.S. Appl. No. 16/085,169; 17 pages.
Corbett, U.S. Office Action mailed Jan. 23, 2019, directed to U.S. Appl. No. 15/750,971; 12 pages.
Extended European Search Report dated Sep. 22, 2017, directed to EP Application No. 17162676.5; 11 pages.
Final Notification of Reason for Refusal dated Apr. 6, 2021, directed to JP Application No. 2018-548932; 10 pages.
First Office Action dated Nov. 26, 2021, directed to CN Application No. 201710828832.6; 15 pages.
Glidden et al. (Apr. 2012) "Characterizing Gold Nanorods in Solution Using Depolarized Dynamic Light Scattering," Journal Of Physical Chemistry C 116(14): 8128-8137.
International Search Report and Written Opinion mailed Dec. 22, 2016, directed to International Application No. PCT/GB2016/052924; 13 pages.
International Search Report and Written Opinion mailed Jan. 12, 2016, directed to International Application No. PCT/GB2016/052786; 9 pages.
International Search Report and Written Opinion mailed Jun. 19, 2017, directed to International Application No. PCT/GB2017/050733; 13 pages.
International Search Report and Written Opinion mailed May 17, 2018, directed to PCT Application No. PCT/EP2018/057033; 17 pages.
International Search Report and Written Opinion mailed Oct. 9, 2009, directed to International Application No. PCT/IB2009/005020; 10 pages.
Notice of Reasons for Refusal dated Aug. 25, 2020, directed to Japanese Application No. 2018-515574; 8 pages.
Notice of Reasons for Refusal dated Jan. 18, 2022, directed to JP Application No. 2019-552113; 10 pages.
Notice of Reasons for Refusal dated Mar. 10, 2020, directed to JP Application No. 2018-548932; 9 pages.
Notice of Reasons for Refusal dated Nov. 9, 2021, directed to JP Application No. 2018-548932; 14 pages.
Notice of Reasons for Refusal dated Sep. 8, 2020, directed to Jp Oa 2018-535260; 8 pages.
Notification of The First Office Action dated Mar. 30, 2020, directed to CN Application No. 201680068213.5; 15 pages.
Ocean Optics Instruction Manual. (2011) "qpod: Temperature-Controlled Sample Compartment for Fiber Optic Spectroscopy," located at http://oceanoptics.com/wp-content/uploads/qpod-manual.pdf visited on Dec. 8, 2016, 14 pages.
Office Action dated May 18, 2021, directed to EP Application No. 17186530.6; 7 pages.
Pike Technologies Product Data Sheet. (2013) "Falcon UV-VIS—Precise Cell Temperature Control Accessory," located at http://www.piketech.com/files/pdfs/FalconPDS1413.Pdf visited on Dec. 8, 2016, 1 page.
Stelzer et al. (Nov. 1984). "Correction of anomalous covariance functions in low-angle quasi-elastic light scattering," Journal of Biochemical and Biophysical Methods 10 (1-2): 69-81.
The First Office Action dated Apr. 29, 2020, directed to CN Application No. 201680055058.3; 19 pages.
Zhu et al., "Analysis of Noisy Dynamic Light Scattering Data Using Constrained Regularization Techniques," Applied Optics 51(31): pp. 7537-7547.

\* cited by examiner

PARTICLE CHARACTERIZATION

REFERENCE TO RELATED APPLICATIONS

This application is a continuation of U.S. application Ser. No. 17/531,021, filed Nov. 19, 2021, which is a continuation of U.S. application Ser. No. 16/496,027, filed Sep. 20, 2019, now U.S. Pat. No. 11,199,486, issued Dec. 14, 2021, which is a U.S. national stage application under 35 U.S.C. § 371 of International Application No. PCT/EP2018/057033, filed Mar. 20, 2018, which claims the priority of EP Application No. 17162676.5, filed Mar. 23, 2017. The entire contents of each priority application is incorporated herein by reference.

FIELD OF THE INVENTION

The invention relates to a particle characterisation instrument, and to a method of particle characterisation, which may include adaptive photon correlation spectroscopy.

BACKGROUND OF THE INVENTION

Photon correlation spectroscopy (also termed dynamic light scattering, or DLS) is a technique for characterising particles by the temporal variation in the intensity of light scattered from a region of the sample. A time series of measurements of scattered light is used to determine a size or size distribution of particles dispersed in the sample.

As discussed in WO2009/090562, it is well known that the intensity of light scattered by particles smaller than the wavelength of the illuminating light is a strong function of particle size. In the Rayleigh scattering limit, where particle radius is below 0.1 of the wavelength of the illuminating light, the intensity of scattered light is proportional to the sixth power of the particle radius. The light scattered from such small particles is also substantially isotropic. Therefore in a dispersion of proteins, typically of size 0.3 nm-20 nm, an aggregate or filter spoil particle, e.g. >100 nm in size, may dominate the signal until it has diffused away from the optical detection volume within the sample. In the often used Cumulants reduction, the output of Z average and polydispersity index (Pdi), may be badly skewed by the larger fraction.

This sensitivity to contaminants is known, with many literature sources stressing the importance of careful sample preparation. However the presence of filter spoil or aggregates is difficult to avoid completely.

A light scattering measurement on a sample containing primarily small particles and also larger particles can be very sensitive to the larger particles, or even to individual large particles. The larger particles can degrade the quality with which the smaller particles can be characterised. Such larger particles may be unwanted contaminants: they may be aggregates of the primary particles, or some other material.

It is also known to perform particle characterisation by analysing a pattern of diffracted/scattered light from a sample. The light source is generally a laser, and this type of analysis may sometimes be referred to as laser diffraction analysis or Static Light Scattering (SLS). Large particles may also be a problem in static light scattering and laser diffraction measurements: scattering from larger particles may obscure relatively small amounts of light scattered from smaller particles.

US2014/0226158 (Trainer) discloses performing light scattering measurements by taking a plurality of data sets of light scattering, each data set corresponding with a certain time (e.g. 1 second). Trainer discloses using an algorithm to sort out data sets into groups with similar characteristics (e.g. those containing large particles). Each group is to be inverted separately to produce multiple size distributions, which are then weighted by total signal time and summed over each channel size to form the total particle size distribution. The algorithm proposed for categorising data sets is based on measurement of spectral power in certain bands, determined using a Fourier transform or by using analog electronic bandpass filters. As an alternative, Trainer proposes categorising data sets using their autocorrelation function, using different bands of time delay in place of different frequency bands.

An improved method and apparatus for characterising particles by light scattering is desirable.

SUMMARY OF THE INVENTION

According to an aspect of the invention, there is provided a method of characterising particles in a sample, comprising:
  obtaining a plurality of scattering measurements, each scattering measurement comprising a time series of measurements of scattered light from a detector, the scattered light produced by the interaction of an illuminating light beam with the sample;
  determining a segregation parameter from each scattering measurement;
  determining a segregation criteria from the segregation parameters;
  identifying contaminated scattering measurements, in which a contaminant was contributing to the scattered light, by comparing the segregation parameter for each scattering measurement with the segregation criteria; and
  determining a particle characteristic from scattering measurements that have not been identified as contaminated scattering measurements.

The use of a dynamic criteria for categorising scattering measurements as unusual or contaminated means that the method can be robust enough to include scattering data from large particles when this is appropriate, for example in the case of a highly polydisperse and variable sample, and to exclude or correct for scattering from large particles when it is appropriate, for example to reject contaminants or aggregates in a less polydisperse sample.

According to an aspect of the invention, there is provided a method of characterising particles in a sample, comprising:
  obtaining a plurality of scattering measurements, each scattering measurement comprising a time series of measurements of scattered light from a detector, the scattered light produced by the interaction of an illuminating light beam with the sample;
  identifying contaminated scattering measurements, in which a contaminant was contributing to the scattered light; and
  determining a particle characteristic from scattering measurements that have not been identified as contaminated scattering measurements by:
  determining an autocorrelation function for each scattering measurement that has not been identified as a contaminated scattering measurement;
  combining the autocorrelation functions to produce an average autocorrelation function from which the particle characteristic is derived.

According to an aspect of the invention, there is provided a method of characterising particles in a sample, comprising:
  obtaining a scattering measurement comprising a time series of measurements of the scattered light from a detector, the scattered light produced by the interaction of an illuminating light beam with the sample;

producing a corrected scattering measurement, comprising compensating for scattering contributions from contaminants by reducing a scattering intensity in at least some time periods of the scattering measurement;

determining a particle characteristic from the corrected scattering measurement.

The scattering measurement may comprise a measurement of scattering intensity with respect to time. The scattering measurement may comprise a sequence of photon arrival times at the detector. The scattering intensity of such a sequence may be defined by binning the photon arrival times, each bin corresponding with a time period. The count of photon arrival times in each bin indicates the intensity (photon count rate) over the corresponding time period (bin).

Reducing the scattering intensity may comprise high-pass filtering the scattering measurement. This may remove the relatively low frequency contribution to scattering that is characteristic of contaminants. The cutoff frequency of the high-pass filter may be at least 0.5 Hz, 1 Hz, 2 Hz, 5 Hz, 10 Hz, 20 Hz or 50 Hz. The high-pass filter may be any appropriate type, such as a Butterworth, Chebyshev, Hanning window etc.

Reducing the scattering intensity may comprise determining a model of scattering contributions from contaminants, and then subtracting the model from the scattering measurement.

Determining the model may comprise low-pass filtering or smoothing the scattering measurement. This has the effect of removing the high frequency scattering signals which are likely to represent light scattering from particles of interest, while retaining scatting signals from contaminants (which tend to be lower in frequency). The model may comprise a low-pass filtered or smoothed version of the scattering measurement. Subtracting a low-pass filtered version of the scattering measurement therefore may produce a "cleaner" scattering measurement.

The low-pass filter or smoothing operation may comprise a moving average, a Savitsky Golay filter, or any of the filter types mentioned above with reference to a high-pass filter. The cut-off frequency for the low-pass filter may be the same as the values mentioned above with reference to a high-pass filter.

The model may comprise a fit to the scattering measurement. There may be instances where a fit may be more suitable than application of smoothing, for example when the count rate trace contains spikes. Spikes in the scattering measurement may be fitted using peak functions (Gaussian, Lorentz, Voight etc.). Fits may be applied over regions where peaks are identified with reference to an intensity exceeding a threshold value, or other peak detection techniques such as finding when the derivative of the smoothed scattering signal crosses zero.

Reducing the scattering intensity may comprise determining a contaminant parameter from the scattering measurement, wherein the step of reducing the scattering intensity is responsive to the contaminant parameter (so that the contaminant parameter affects at least one of an amount of reduction in scattering intensity and a time period of reducing scattering intensity). The contaminant parameter could comprise, for example, a cut-off frequency of the high-pass or low-pass filter described above. The contaminant parameter could, alternatively or additionally, comprise a threshold intensity (e.g. count rate) corresponding with contaminant scattering.

Determining the contaminant parameter from the scattering data means that the reduction of contaminant scattering is a dynamic process that responds to the type of data. The result of this is a more robust method that is appropriate for analysis of both highly polydisperse samples and monodisperse samples.

Determining the contaminant parameter from the scattering measurement may comprise finding statistical outliers in spectral content of the scattering measurement.

Determining the contaminant parameter may comprise determining a spectral content of each of a plurality of time periods of the scattering measurement. For example, the time series of measurements may comprise a series of shorter scattering measurements, and the spectral content of each scattering measurement may be determined. A Fourier transform may be used to determine the spectral content of each time period.

Determining the contaminant parameters may comprise determining a statistical property of the spectral power at each of a range of frequencies. The statistical property may comprise an average and/or a standard deviation. The range of frequencies may comprise a range of frequencies within which it is expected that transient contaminants may make a significant contribution. The range of frequencies may comprise up to 10 Hz, 20 Hz, 30 Hz, 40 Hz, 50 Hz or 100 Hz. A cut-off frequency may be determined by finding, within the range of frequencies, a lowest frequency at which none of the time periods comprise spectral powers that are outliers.

A measurement (e.g. a spectral power) may be considered an outlier when it deviates from an average value by more than a threshold deviation. The threshold deviation may be determined with reference to a standard deviation (e.g. two or three standard deviations).

Reducing a scattering intensity in at least one time period of the scattering measurement may produce an adjusted scattering measurement.

In order to generate a meaningful signal that varies in amplitude with time, it is necessary to select a bin width that is wide enough to include more than one photon arrival for at least some bin times. The time resolution of a binned time history of scattering intensity is limited by the temporal width of the bin. This means that a correlogram derived from a binned time history will not resolve very short decay times: temporal resolution that is available in the raw photon arrival time data must be discarded by binning the signal.

Producing a corrected scattering measurement may comprise producing a composite autocorrelation function by combining part of a raw autocorrelation function, derived from the uncorrected scattering measurement (e.g. a sequence of photon arrival times), with part of an adjusted autocorrelation function, derived from the adjusted scattering measurement. The part of the raw autocorrelation function may correspond with delay times that are shorter than or equal to a selected delay time. The part of the adjusted autocorrelation function may correspond with delay times that are longer than or equal to the selected delay time. The raw autocorrelation function may be normalised (i.e. multiplied by a factor) to be continuous with the adjusted autocorrelation function at a selected delay time.

The selected delay time may be in the range of 50 to 200 micro-seconds. The selected delay time may be derived from the bin width of the adjusted scattering measurement, e.g. 5 times or 10 times the bin width. The selected delay time may be determined by performing a cumulants analysis, or by differentiation of the adjust autocorrelation function to find a point of minimum curvature and using the corresponding delay time as the selected delay time.

The raw autocorrelation function may be normalised by a factor selected to cause the gradient of a linear region of the raw autocorrelation function (e.g. corresponding with the polydispersity in a Cumulants analysis) to match a gradient of the same linear region of the adjusted autocorrelation function.

Where the scattering measurement comprises a sequence of photon pulses (corresponding with photon arrival times), reducing the scattering intensity may comprise deleting photon pulses (e.g. photon arrival times) from the sequence. This has the advantage of allowing temporal resolution to be preserved in the corrected scattering measurement, without the need for combining raw data with corrected data. Deleting photon pulses from the sequence may be considered analogous to a software optical attenuator.

Deleting events from the sequence may comprise selecting bins (comprising photon pulses for deletion) based on scattering intensity (e.g. determined as described above, by binning). A threshold scattering intensity for selecting bins may be determined from the scattering measurement (e.g. based on a distribution of the scattering measurement). For example, the threshold scattering intensity may be determined from an average intensity of the scattering measurement. The threshold scattering intensity may, for example, comprise the average intensity (of the scattering measurement) plus the difference between the average and minimum count rate, or may comprise the average intensity plus three standard deviations, or may comprise the minimum count rate plus two times the square root of the minimum count rate.

Selected bins may each be corrected by deleting a number of photon pulses from the selected bin. The appropriate number of photons may be the excess number of photon pulses above the threshold. The photon pulses may be selected at random from those within the selected bin.

Reducing the scattering intensity may comprise directly correcting a scattering measurement comprising a sequence of photon pulses by subtracting a model of scattering contributions from the sequence of photon pulses. The model of the scattering contributions from contaminants may be determined as described above (for example by binning the photon pulses and low-pass filtering or smoothing). The model of the scattering contributions may comprise an estimate of the number of photon pulses in each bin due to scattering from a contaminant. Correcting each bin therefore may comprise deleting the number of photon pulses from each bin (e.g. by selecting them at random) that is indicated by the model.

This direct correction (e.g. before binning) of a sequence of photon pulses avoids compromising the temporal resolution of the scattering signal, and results in a corrected autocorrelation function that can resolve very short decay times.

Reducing the scattering intensity may comprise modifying a recorded scattering measurement. Reducing the scattering intensity may comprise attenuating a scattering signal in the optical domain.

The method may comprise illuminating the sample in a sample cell with the light beam, so as to produce the scattered light by the interaction of the light beam with the sample.

Obtaining scattering measurements may comprise receiving the measurements from the detector, retrieving the scattering measurements from a non-volatile machine readable medium (e.g. a hard disk, SSD, optical medium, etc.), or receiving the measurements via a communication channel (e.g. network, serial connection, USB, SATA, IDE, PCIE).

Determining a particle characteristic may comprise determining at least one of: a particle size, a particle size distribution, a zeta potential, a protein mobility, and a rheological property.

The method may further comprise determining a further particle characteristic from scattering measurements that have been identified as those in which a contaminant was contributing to the scattered light. The method may further comprise determining an average particle characteristic from all the scattering measurements.

The method may comprise determining an autocorrelation function for each scattering measurement.

Where a plurality of scattering measurements have been obtained, determining the particle size distribution may comprise combining autocorrelation functions for each scattering measurement that has not been identified as a contaminated scattering measurement. Determining the further particle size distribution may comprise combining autocorrelation functions for each contaminated scattering measurement. In general, determining a particle size distribution may comprise combining autocorrelation functions for the scattering measurements to be included.

Combining autocorrelation functions may comprise adding together the autocorrelation functions. Combining autocorrelation functions may comprise determining a mean autocorrelation function.

The segregation parameter for each scattering measurement may be determined from the autocorrelation function for that scattering measurement. Determining the segregation parameter may comprise inverting the autocorrelation function for each scattering measurement to determine particle characteristics the each measurement (e.g. using the cumulants method, or any other method, such as CONTIN).

The segregation parameter may comprise at least one of: a polydispersity index (Pdi), average particle size ($Z_{average}$), an autocorrelation value corresponding with at least one delay time, a spectral power corresponding with at least one range of frequencies, an average intensity, an intensity variation (i.e. a maximum minus a minimum intensity), and/or a Doppler frequency width.

The term "average" in this disclosure includes mean, mode and median, and includes parameters calculated from a best fit (e.g. using a normal distribution) to a distribution or histogram of the segregation parameters. The segregation criteria may be used as a threshold for identifying contaminated scattering measurements.

The segregation criteria may be derived from at least one statistical property of the segregation parameters. Determining the segregation criteria may comprise determining an average and/or a standard deviation of the segregation parameters. The segregation criteria may be derived from the standard deviation and average value of the segregation parameter. The segregation criteria may be determined by adding 2, 3, 4, 5, or 6 standard deviations to the average segregation parameter.

There may be a single detector. Alternatively, each (or the) scattering measurement may comprise a time series of measurements of the scattered light from a plurality of detectors. At least some of the plurality of detectors may be arranged to receive light scattered at different scattering angles to the illuminating light beam. At least some of the plurality of detectors may be arranged to receive light scattered at the same scattering angle to the illuminating light beam. A reference to a scattering angle may refer to a centroid of the detector.

The segregation parameter may comprise a distribution of intensity at different scattering angles (based on the average intensity over the time series). For example, an average distribution of scattered light at different scattering angles may be used as a segregation criteria, and contaminated scattering measurement periods identified based on a lack of similarity with the average distribution of scattered light at different scattering angles.

Where the segregation criteria comprises more than one value, a weighted average of the difference between each value of the segregation parameter and the segregation criteria may be used to identify contaminated scattering measurements.

Determining a particle size distribution may comprise performing a dynamic light scattering measurement from the processed time series of measurements.

Determining a particle size distribution may comprise performing a light diffraction particle characterisation analysis (for example using Fraunhofer or Mie scattering theory) on the time series of measurements. The methods disclosed herein may be applied to Static Light Scattering (SLS), Dynamic Light Scattering (DLS), Electrophoretic Light Scattering (ELS), Magnetophoretic Light Scattering (MLS) and related methodologies, for instance to measure protein mobility, surface zeta, microrheology etc. Correlated light scattering data could be processed for microrheology measurements, with transient effects removed in a manner to the other embodiments described herein.

The term "contaminant" includes large particles or otherwise unusual particles. The term "large particle" does not exclude a plurality of large particles. The term "large particle" may mean a particle with a diameter larger than a predetermined threshold size. In some embodiments, it is simply unusual (or transient) scattering data that is identified/corrected for, for instance based on an analysis (e.g. statistical analysis) of a parameter determined with reference to the data.

Other embodiments may use a combination of the above methods to correct for light scattered by contaminants.

By correcting for the signal due to scattering from contaminants in this way, more accurate information about the small particles present in a sample can be extracted from scattering measurements, which may reduce the need for multiple photon counting detectors. Fitting a model of large particle behaviour to the data and removing the estimated contribution of contaminants may be particularly advantageous, as at least a substantial part of small particle data is not lost from those times during which a large particle dominated the measured signal.

Where a plurality of scattering measurements have been obtained, the duration of each scattering measurement may be: 5 seconds or less; 2 seconds or less; 1 second or less; 0.5 seconds or less; or 0.1 seconds or less. At least 10, 20, 50 or 100 scattering measurements may be used to characterise a sample.

Determining a particle size distribution from scattering measurements that have not been identified as contaminated scattering measurements may comprise analysing each scattering measurement separately, and then using the average of each scattering measurement analysis to determine the particle size distribution. For example, the autocorrelation function for each scattering measurement could be combined to produce an average correlogram, and a particle size distribution determined from the average correlogram.

The method may comprise performing an initial number of scattering measurements, with scattering measurements being obtained until an average obtained from the combined data has converged (e.g. until the average correlogram has converged). A convergence criteria may be based on the amount that the average obtained from the combined data changes over a number of succeeding measurements.

In some embodiments the segregation criteria may be user selectable. Information (e.g. statistical information, a distribution of a parameter and/or analysis results obtained using the threshold) may be presented to the user to help the user make a selection of the appropriate threshold.

According to an aspect of the invention, there is provided a method of identifying contaminated portions of a scattering measurement comprising a series of photon arrival times of scattered light at a detector, the scattered light produced by the interaction of an illuminating light beam with the sample, comprising:

determining a gradient of photon arrival time as a function of photon number for each of a plurality of windows; and identifying contaminated windows, that comprise light scattering from contaminants, by comparing the gradient for each window with a threshold gradient range.

The method may comprise identifying an optimal period of the scattering measurement, corresponding with the longest continuous period of the scattering measurement that does include contaminated windows.

The method may comprise determining a particle characteristic from the optimal period.

The threshold gradient range may be determined from the gradient of each of the plurality of windows. Determining the threshold gradient range may comprise determining an average of the gradients of the windows. For example the threshold gradient range may be a percentage range on either side of an average window gradient.

The threshold gradient range may be determined from the gradient of the whole scattering measurement, for example from a percentage deviation of the gradient of the whole scattering measurement. The gradient of the whole scattering measurement may be determined from a linear fit to the whole scattering measurement.

Each window may correspond with a time period or a number of photon arrival times. A larger window may correspond with a longer time period or a greater number of photon arrival times, and a smaller window may correspond with a shorter time period or a smaller number of photon arrival times.

The method may comprise making the window smaller in response to an increased required degree of sensitivity to contaminants.

The method may comprise an iterative process, in which a large window is used to initially identify a candidate optimal period, and a smaller window (or sequence of smaller windows) is used to increase a level of confidence in the optimal period being free from contaminants.

According to an aspect of the invention, there is provided a non-volatile machine readable medium comprising instructions that, when run on a suitable processor, cause the processor to:

obtain a plurality of scattering measurements, each scattering measurement comprising a time series of measurements of scattered light from a detector, the scattered light produced by the interaction of an illuminating light beam with the sample;

determine a segregation parameter from each scattering measurement;

determine a segregation criteria from the segregation parameters;

identify contaminated scattering measurements, in which a contaminant was contributing to the scattered light, by comparing the segregation parameter for each scattering measurement with the segregation criteria; and determine a particle characteristic from scattering measurements that have not been identified as contaminated scattering measurements.

According to an aspect of the invention, there is provided a non-volatile machine readable medium comprising instructions that, when run on a suitable processor, cause the processor to:

identify contaminated scattering measurements, in which a contaminant was contributing to the scattered light; and determine a particle characteristic from scattering measurements that have not been identified as contaminated scattering measurements, comprising:

determining an autocorrelation function for each scattering measurement that has not been identified as a contaminated scattering measurement;

combining the autocorrelation functions to produce an average autocorrelation function from which the particle characteristic is derived According to an aspect of the invention, there is provided a non-volatile machine readable medium comprising instructions that, when run on a suitable processor, cause the processor to:

obtain a scattering measurement comprising a time series of measurements of the scattered light from a detector, the scattered light produced by the interaction of an illuminating light beam with the sample;

produce a corrected scattering measurement, comprising compensating for scattering contributions from contaminants by reducing a scattering intensity in at least some time periods of the scattering measurement;

determine a particle characteristic from the corrected scattering measurement.

According to an aspect of the invention, there is provided a non-volatile machine readable medium comprising instructions that, when run on a suitable processor, cause the processor to:

identify contaminated portions of a scattering measurement comprising a series of photon arrival times of scattered light at a detector, the scattered light produced by the interaction of an illuminating light beam with the sample, by steps comprising:

determining the gradient of photon arrival time as a function of photon number for each of a plurality of windows; and determining contaminated windows that comprise light scattering from contaminants, by comparing the gradient for each window with a threshold gradient range.

According to an aspect of the invention, there is provided an apparatus for characterising particles, comprising: a light source, a sample cell, a detector and a processor; wherein the light source is operable to illuminate a sample within the sample cell with a light beam so as to produce scattered light by interactions of the light beam with the sample;

the detector is configured to detect the scattered light and produce a time series of measurements; and the processor is configured to:

obtain a plurality of scattering measurements, each scattering measurement comprising a time series of measurements of scattered light from the detector, the scattered light produced by the interaction of an illuminating light beam with the sample;

determine a segregation parameter from each scattering measurement;

determine a segregation criteria from the segregation parameters;

identify contaminated scattering measurements, in which a contaminant was contributing to the scattered light, by comparing the segregation parameter for each scattering measurement with the segregation criteria; and determine a particle characteristic from scattering measurements that have not been identified as contaminated scattering measurements.

According to an aspect of the invention, there is provided an apparatus for characterising particles, comprising: a light source, a sample cell, a detector and a processor; wherein the light source is operable to illuminate a sample within the sample cell with a light beam so as to produce scattered light by interactions of the light beam with the sample;

the detector is configured to detect the scattered light and produce a time series of measurements; and the processor is configured to:

identify contaminated scattering measurements, in which a contaminant was contributing to the scattered light; and determine a particle characteristic from scattering measurements that have not been identified as contaminated scattering measurements, comprising:

determining an autocorrelation function for each scattering measurement that has not been identified as a contaminated scattering measurement;

combining the autocorrelation functions to produce an average autocorrelation function from which the particle characteristic is derived.

According to an aspect of the invention, there is provided an apparatus for characterising particles, comprising: a light source, a sample cell, a detector and a processor; wherein the light source is operable to illuminate a sample within the sample cell with a light beam so as to produce scattered light by interactions of the light beam with the sample;

the detector is configured to detect the scattered light and produce a time series of measurements; and the processor is configured to:

obtain a scattering measurement comprising a time series of measurements of the scattered light from the detector;

produce a corrected scattering measurement, comprising compensating for scattering contributions from contaminants by reducing a scattering intensity in at least some time periods of the scattering measurement;

determine a particle characteristic from the corrected scattering measurement.

According to an aspect of the invention, there is provided an apparatus for characterising particles, comprising: a light source, a sample cell, a detector and a controller; wherein the light source is operable to illuminate a sample within the sample cell with a light beam so as to produce scattered light by interactions of the light beam with the sample;

the detector is configured to detect the scattered light and produce a time series of measurements; and the controller is configured to:

obtain a scattering measurement comprising a time series of measurements of the scattered light from the detector;

compensate for scattering contributions from contaminants by reducing a scattering intensity in at least some time periods of the scattering measurement.

The apparatus may comprise a variable attenuator. The variable attenuator may be configured to compensate for scattering contributions from contaminants by attenuating scattered light. The variable attenuator may be configured to compensate for scattering contributions from contaminants by attenuating the illuminating light beam.

The controller may be operable to provide a signal to the variable attenuator that is proportional to a scattering contribution from contaminants.

In some embodiments the detector may comprise a photon counting detector, and/or may be configured to detect back scattered, forward scattered and/or side scattered light. The apparatus may comprise a plurality of detectors configured to detect scattered light. At least some of the detectors may be configured to detect light scattered at different scattering angles, and/or at least some of the detectors may be configured to detect light scattered at the same scattering angle.

The apparatus may further comprise at least one optical fibre that provides an optical path between the detector(s) and a scattering volume that is illuminated by the light source.

According to an aspect of the invention, there is provided an apparatus for characterising particles, comprising: a light source, a sample cell, a detector and a processor; wherein
the light source is operable to illuminate a sample within the sample cell with a light beam so as to produce scattered light by interactions of the light beam with the sample;
the detector is configured to detect the scattered light and produce a scattering measurement comprising a series of photon arrival times of scattered light at the detector; and
the processor is configured to identify contaminated portions of the scattering measurement by:
determining the gradient of photon arrival time as a function of photon number for each of a plurality of windows; and
determining contaminated windows, that comprise light scattering from contaminants, by comparing the gradient for each window with a threshold gradient range.

Features of each and every aspect may be combined with those of each and every other aspect. Aspects relating to an apparatus may be configured to perform the corresponding method, and may be configured to perform any of the optional method steps.

BRIEF DESCRIPTION OF THE DRAWINGS

Example embodiments will be described, purely by way of example, with reference to the accompanying drawings, in which.

DETAILED DESCRIPTION OF THE INVENTION

Figure 1:
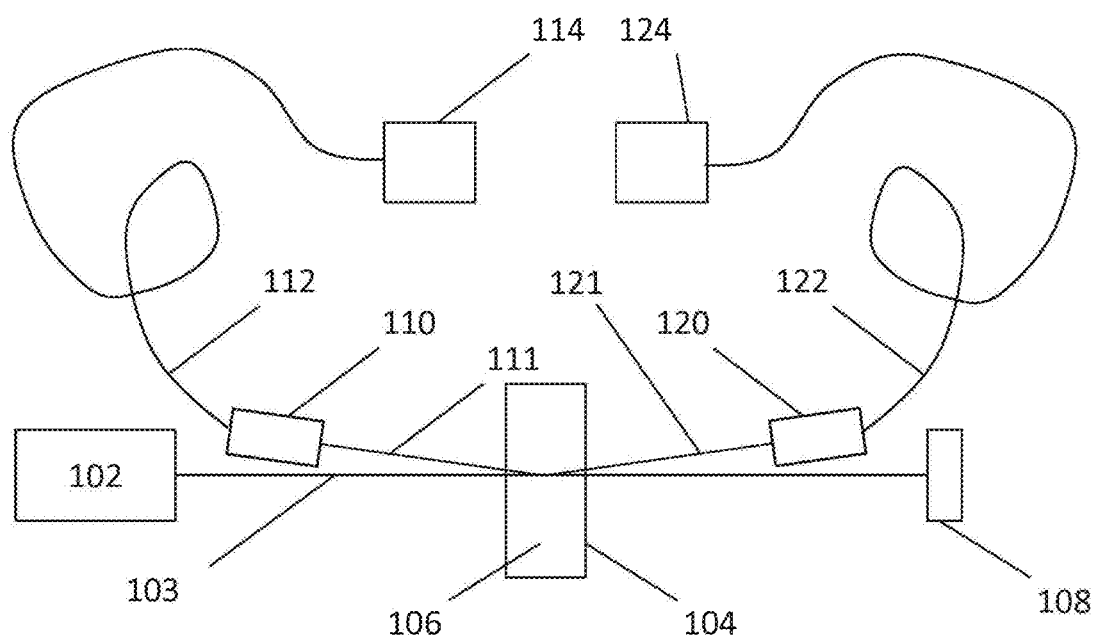
FIG. 1 is a schematic of a particle characterisation apparatus according to an embodiment.

FIG. 1 shows a particle characterisation apparatus comprising a light source 102, sample cell 104, backward scatter detector 114, forward scatter detector 124, and light trap 108.

The light source 102 may be a coherent light source, such as a laser, and may output mono-chromatic light. Alternatively, the light source 102 may be an LED. The light source 102 is configured to illuminate a sample 106 within the sample cell 104 with a light beam 103 along a light beam axis.

The interaction of the illuminating light beam 103 with the sample 106 produces scattered light. Forward scattered light 121 may be defined as light that is scattered at angles of less than 90 degrees to the direction of the illuminating light beam axis. Backward scattered light 111 may be defined as light that is scattered at angles of more than 90 degrees to the direction of the light beam axis (i.e. having a component in the opposite direction to the illuminating light beam).

The forward scatter detector 124 is configured to detect forward scattered light 121. The forward scattered light 121 is directed to the detector 124 via a collecting lens 120, which couples the scattered light 121 to an optical fibre 122. The optical fibre 122 provides an optical path to the forward scatter detector 124. The collecting lens 120 may be a graded refractive index lens, or any other suitable lens. Further, or fewer optical components may be included in the optical path between the illuminated region of the sample 106 and the forward scattering detector 124. For instance, in some embodiments, the optical fibre 122 may be omitted, and free space optics used instead.

The backward scatter detector 114 is configured to detect backward scattered light 111. The backward scattered light 111 is directed to the sensor via a collecting lens 110, which couples the scattered light 111 to an optical fibre 112. The optical fibre 112 provides an optical path to the backward scatter detector 114. The collecting lens 110 may be a graded refractive index lens, or any other suitable lens. Further, or fewer optical components may be included in the optical path between the illuminated region of the sample 106 and the backward scattering detector 114. For instance, in some embodiments, the optical fibre 112 may be omitted, and free space optics used instead.

In some embodiments, only a single detector may be provided, for instance only a side scattering detector (detecting light scattered at 90 degrees), or only a forward scattering detector, or only a backward scattering detector may be present.

The apparatus of FIG. 1 may be configured to perform a dynamic light scattering analysis, for instance using the output from a single detector (such as the backward scattering detector 114).

Figure 2:
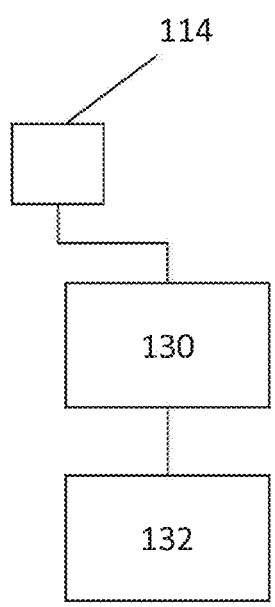
FIG. 2 is a schematic of a particle characterisation apparatus processing means according to an embodiment.

FIG. 2 shows detector 114, processor 130 and output device 132. The processor 130 is configured to receive a time series of light intensity measurements from the detector 114, and to perform a correlation operation on the measurements to characterise particles of a sample by dynamic light scattering. The processor 130 may store the measurements in a machine readable storage medium, for example in memory, on a solid state storage drive, a hard disk, in the cloud etc. The processor 130 may then output the results of the analysis to the output device 132, which may comprise a display screen.

The processor 130 is configured to determine, from a time series of measurements from a detector 114, which measurements were taken at times when a contaminant (e.g. a large particle) was contributing to the scattered light.

Figure 3:
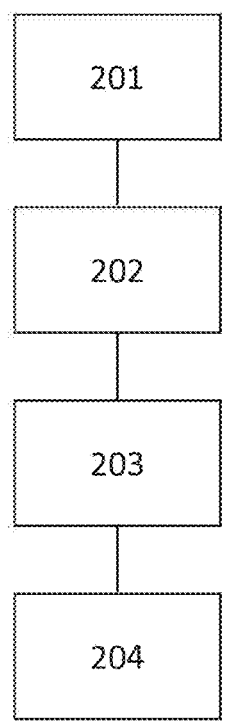
FIG. 3 is a flow diagram of a method according to an embodiment.

Apparatus according to an embodiment may combine the features shown in FIGS. 1 and 2 (and described with reference to these Figures), and may be configured to perform the method which is shown in outline form in FIG. 3.

FIG. 3 shows a series of method steps 201-204. Step 201 comprises illuminating a sample 106 in a sample cell 104 with a light beam 103, so as to produce scattered light 111 by the interaction of the light beam 103 with the sample 106.

Step 202 comprises obtaining a time series of measurements of the scattered light 111 from detector 114, which may be a single detector. The term "single detector" as used herein may include a plurality of detectors (e.g. a 1D or 2D detector element array) corresponding with a specific light scattering angle (or narrow range of light scattering angles, such as 5 degrees or less).

Step 203 comprises determining, from the time series of measurements from the detector 114, which measurements were taken at times when a contaminant (e.g. large particle) was contributing to the scattered light. A number of different methods can be used to do this, as will be explained more fully below.

Step 204 comprises determining a particle characteristic (e.g. a particle size distribution), either from the measurements which are not taken at times when a contaminant was contributing to the scattered light, or from measurements which have been corrected to mitigate the effect of scattering from contaminants. Step 204 may comprise performing a dynamic light scattering measurement using the time series of measurements. Correcting for scattered light from a contaminant may improve the quality and/or accuracy of the characterisation of the particles, because the relatively intense scattering from the contaminants (e.g. larger particles) will thereby be prevented from corrupting the characterisation of smaller particles within the sample (which may be the particles of most interest).

Figure 4:
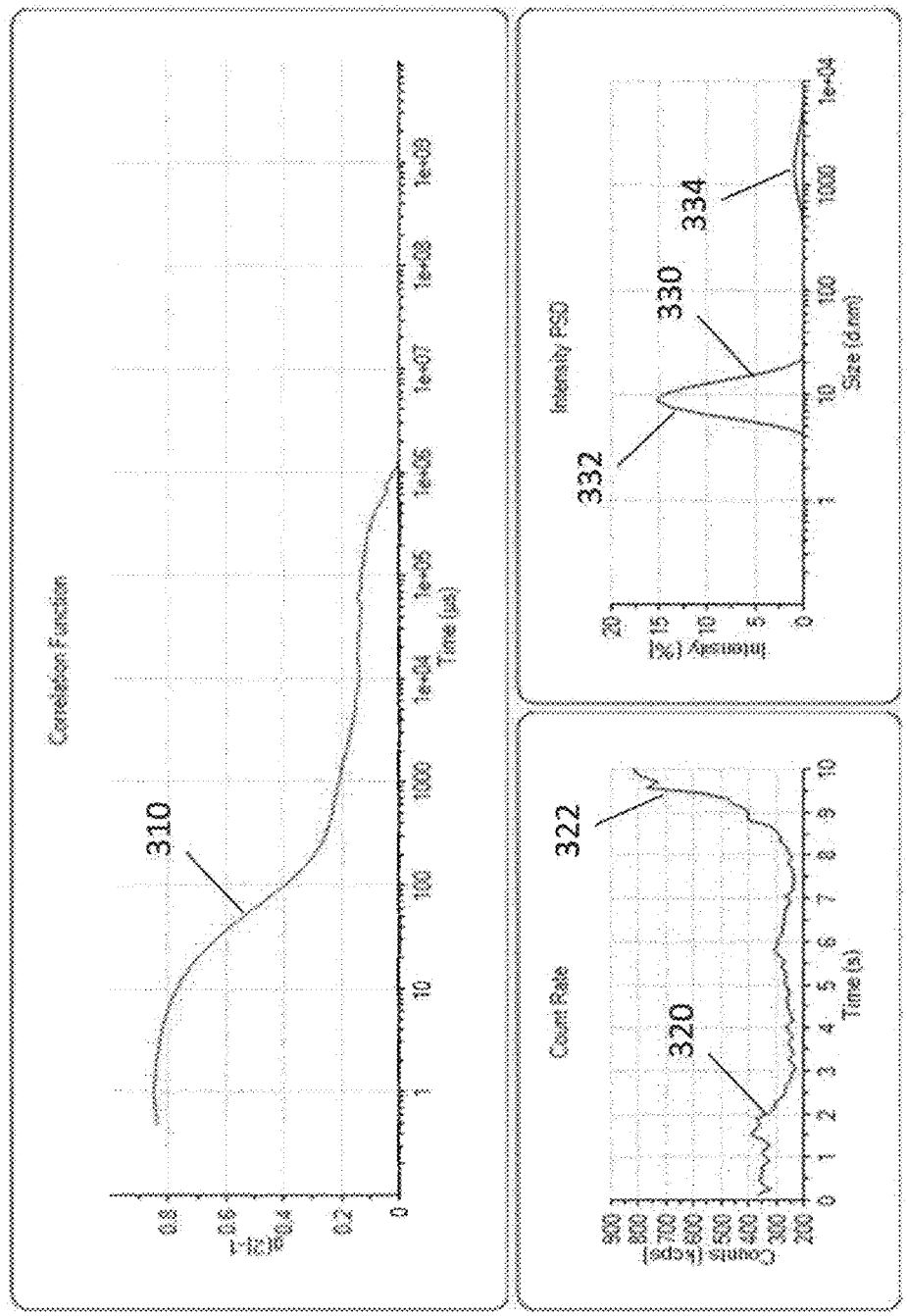
FIG. 4 shows some example results, for processing according to an embodiment.

FIG. 4 illustrates a time series of measurement results from a detector 320, along with a plot of a correlation function 310 obtained from the measurement results 320. A particle size distribution (PSD) plot 330 of scattered light intensity with respect to particle size is also shown. Examination of the measurements 320 shows that the light intensity markedly increases after t=8 s, corresponding with scattering from a large particle.

This is one way to identify measurements that are taken at times when a large particle is scattering light. In the present case, for example, a threshold intensity value of 600 counts per second could be used to identify light scattering from a large particle. Data within a predetermined time (e.g. 1 s or 0.5 s) of this threshold being exceeded may be excluded from a subsequent DLS analysis. For example, if the threshold is exceeded at t=9 s, data from t=8 s onwards may be excluded, or a fitted model of the scattering contribution due to the large particle removed from the data. The precise values of intensity threshold and time window may depend on the instrument configuration and the specific measurement setup. The threshold may be 2, 3, 4, or 5 standard deviations of the intensity values (which may be determined after a complete measurement has been taken, or dynamically, as the measurement is taken).

Alternatively, or additionally, the frequency of features within the time series of measurements may be used to identify light scattering from a large particle: a low frequency feature is likely to correspond with a large particle. In the example data 320 the measurement is relatively stable, until the low frequency, large amplitude excursion from t=8 s. The combination of low frequency and large amplitude fluctuations in light intensity may be particularly characteristic of large particles, and may be used to identify times when a large particle is scattering. A frequency of less than 10, 5, 4, 3, 2, 1, or 0.5 Hz or less may be associated with a large particle.

The PSD plot 330 is based on processing the full time series of data, including the time series between t=8 s and t=10 s. It shows a light intensity peak corresponding with a particle size of around 1000 nm.

One way to identify that a large particle is present within a particular time window is to partition the full time series of data (or run) into a plurality of scattering measurements (or sub-runs) with shorter periods runs, and then to analyse each of the sub-runs to determine whether it includes scattering from a contaminant. For example, if the data 320 were partitioned into a plurality of sub-runs of duration 1 second, and a DLS correlation analysis performed on the data of each sub-run, it would be straightforward to identify in which sub-run a significant amount of light scattering is contributed by a large particle or particles (e.g. more than 1%, 5% or 10% of the total scattered light, or when the intensity PSD exceeds 1, 5 or 10% at a particle size over a specific threshold). The sub-runs with a significant amount of scattering from contaminants (e.g. larger particles) may then be excluded from the measurement series. The remaining measurement data may then be combined, and a DLS measurement performed based on the combined remaining data. Alternatively, a model of scattering due to the contaminant may be fitted to the data within each sub-run with a significant amount of scattering from contaminants. The estimate of the scattering signal due to the contaminant, as calculated by the fitted model, may then be removed from the data within the sub-run. The remaining corrected data may then be combined with the data from the other sub-runs in the measurement series, and a DLS measurement performed on the combined corrected data series.

Embodiments of the invention may provide significantly improved DLS characterisation fidelity in cases where large particles are problematic.

Figure 5:
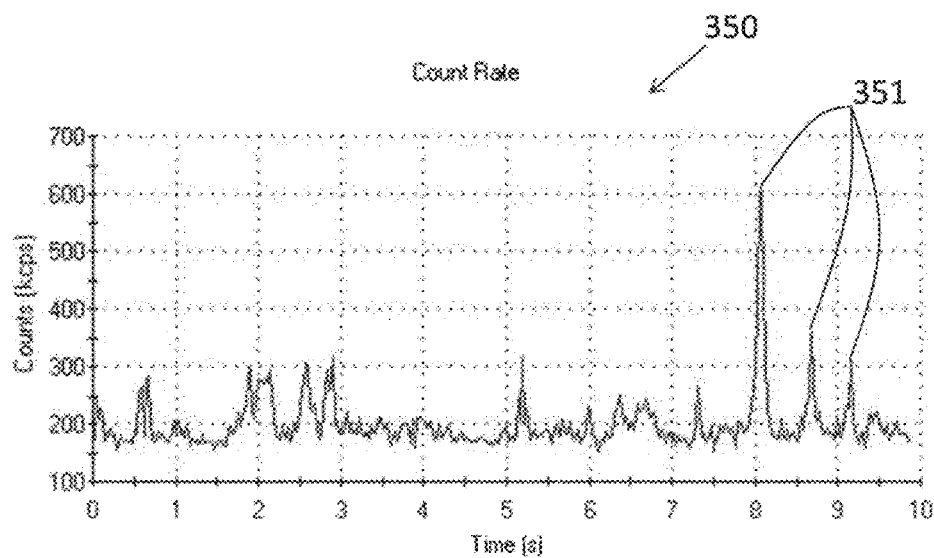
FIG. 5 shows a graph of photon count intensity over time, obtained from a poor quality sample in which spikes are present in the data, as a result of scattering from highly scattering particles.

FIG. 5 shows a graph 350 of photon count rate over time obtained from a scattered light detector. Spikes 351 are present in the data (not all of which are labelled in FIG. 5), corresponding with periods of time when a highly scattering particle (i.e. a contaminant) is within the measurement volume of the instrument. One way to deal with this contribution from contaminants is to correct the data to remove the scattering contributions from the contaminants—this may be advantageous when compared with simply discarding the contaminated data, because potentially valuable measurement data is retained.

Figure 6:
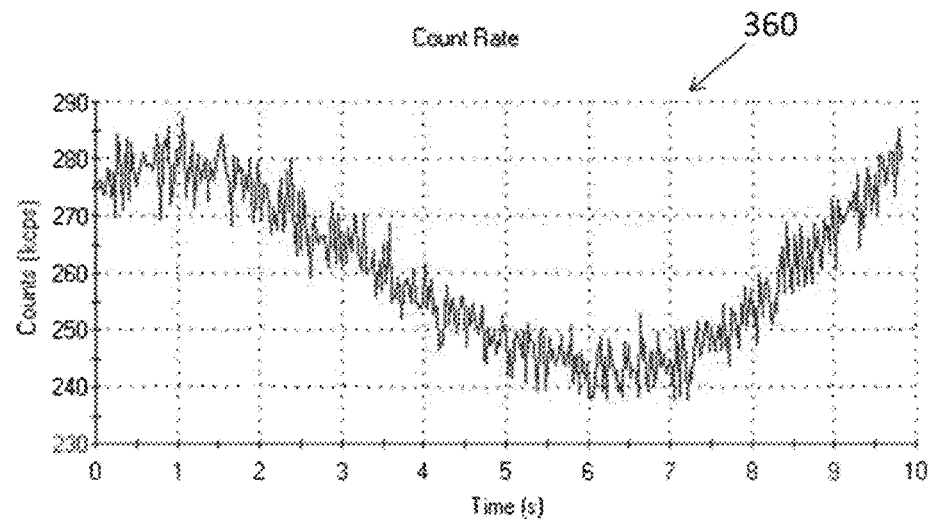
FIG. 6 shows a graph of photon count intensity over time, obtained from a poor quality sample in which a large particle causes a slow fluctuation in the data.

FIG. 6 shows a graph 360 of photon count rate over time obtained from a scattering detector. In contrast to the short duration "spikes" of FIG. 5, the contaminant for the data of FIG. 6 is a large particle that slowly impinges on the measurement volume, resulting in a low frequency variation in detected intensity. This type of contribution to scattering from a larger particle may be dealt with by removing the low frequency component of the data.

It is desirable to be able to identify contaminated scattering measurements (e.g. sub-runs in which larger particles contributed to scattering). One way to do this is by determining intensity of each sub-run, and using an average intensity value (e.g. mean, median value etc) as a rejection criteria. Larger particles are associated with stronger scattering, so higher intensity sub-runs may be associated with larger particles. The threshold for rejection of sub-runs may be determined from the ensemble characteristics of all the sub-runs. For instance the threshold average intensity could be derived from an average intensity taken across all sub-runs (e.g. two or three standard deviations from an average intensity for all sub-runs).

Figure 7:
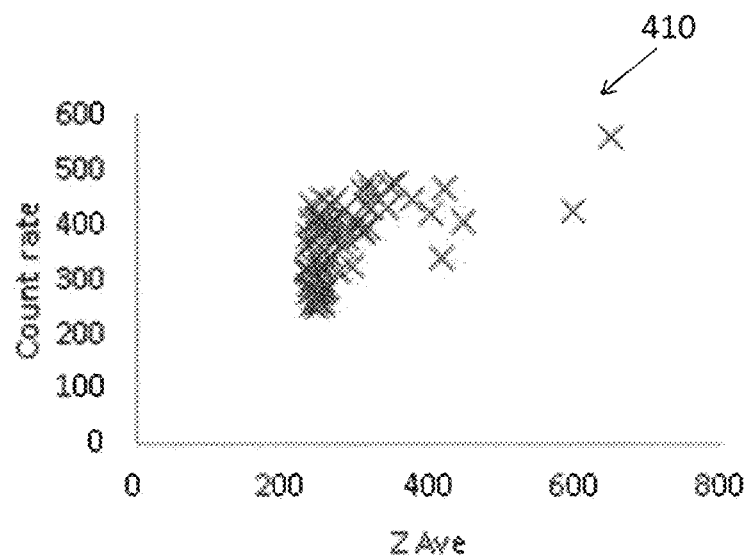
FIG. 7 shows a graph of count rate as a function of Z-average size for a sample of 220 nm latex spheres containing filter spoil (contaminants)

FIG. 7 shows a graph 410 of the mean count rate (intensity) as a function of the Z average particle size for a plurality of scattering measurements (or sub-runs) obtained from a measurement performed on a sample comprising 220 nm latex spheres and some filter spoil (larger size particulate contaminants). The Z average may be determined for each sub-run as defined in ISO 13321 and/or ISO 22412. One drawback of a rejection criteria based on average intensity is that it may result in the rejection of many sub-runs that the Z average indicates are associated with small particles.

Figure 8:
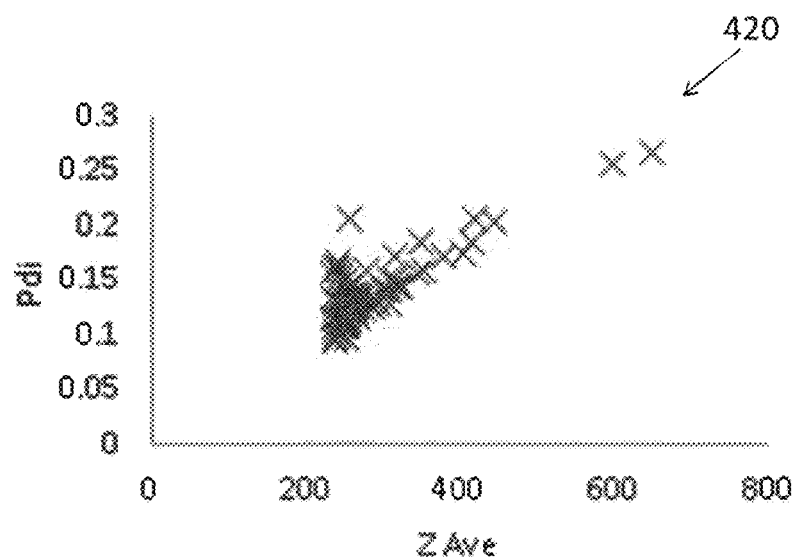
FIG. 8 shows a graph of polydispersity index (Pdi) as a function of Z-average size for the same sample used for FIG. 7.

An alternative is to reject sub-runs based on a polydispersity index (Pdi), which may be determined as defined in ISO 13321 and/or ISO 22412 from a cumulants analysis. FIG. 8 shows a graph 420 of the polydispersity index Pdi against the Z average for the same sub-run data as shown in FIG. 7. There is a stronger correlation between Z average and polydispersity index, which means that a rejection criteria based polydispersity is likely to be more selective to sub-runs dominated by larger particles.

A further alternative is to use the Z average particle size as a rejection criteria, rejecting sub-runs with a Z average particle size that exceeds a threshold value. Again, the threshold value may be determined with reference to a Z average value that is calculated from the ensemble of all sub-runs (e.g. rejecting values more than three standard deviations from a Z average for all sub-runs).

Figure 9:
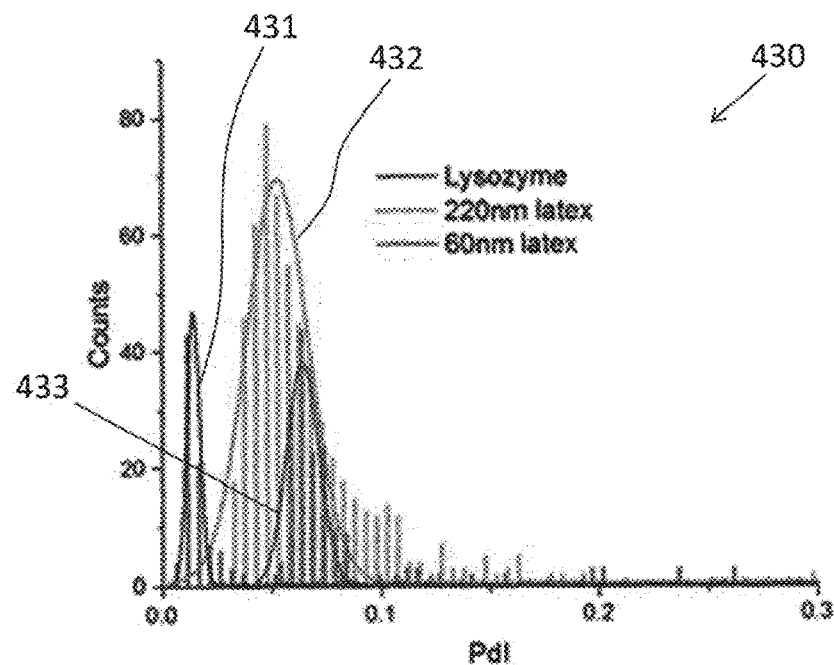
FIG. 9 shows a histogram of the polydispersity index (Pdi) for three different samples containing either dust simulant or aggregates.

FIG. 9 is a set of Pdi histograms 430 illustrating how threshold rejection criteria may be calculated for a measurement, A first, second and third histogram of Pdi values is shown, corresponding with lysozyme, 220 nm latex spheres and 60 nm latex spheres respectively. A first, second and third normal distribution 431, 432, 433 is respectively fitted to each histogram (for example, using a least squares penalty function). An average value of Pdi for each measurement and a standard deviation σ may be determined from the normal distribution 431, 432, 433 that best fits the histogram obtained from the sub-runs of each measurement, The use of a best fit normal distribution helps to avoid skewing of the average by outlier sub-runs, which can be seen in FIG. 9 (e.g. with Pdi values greater than 0.15).

The threshold rejection criteria may comprise an average obtained from a best fit to a histogram of sub-runs (e.g. Z average, Pdi or intensity), plus a multiple of standard deviations, for example three (or 2, 4, 5 6, etc).

Figure 10:
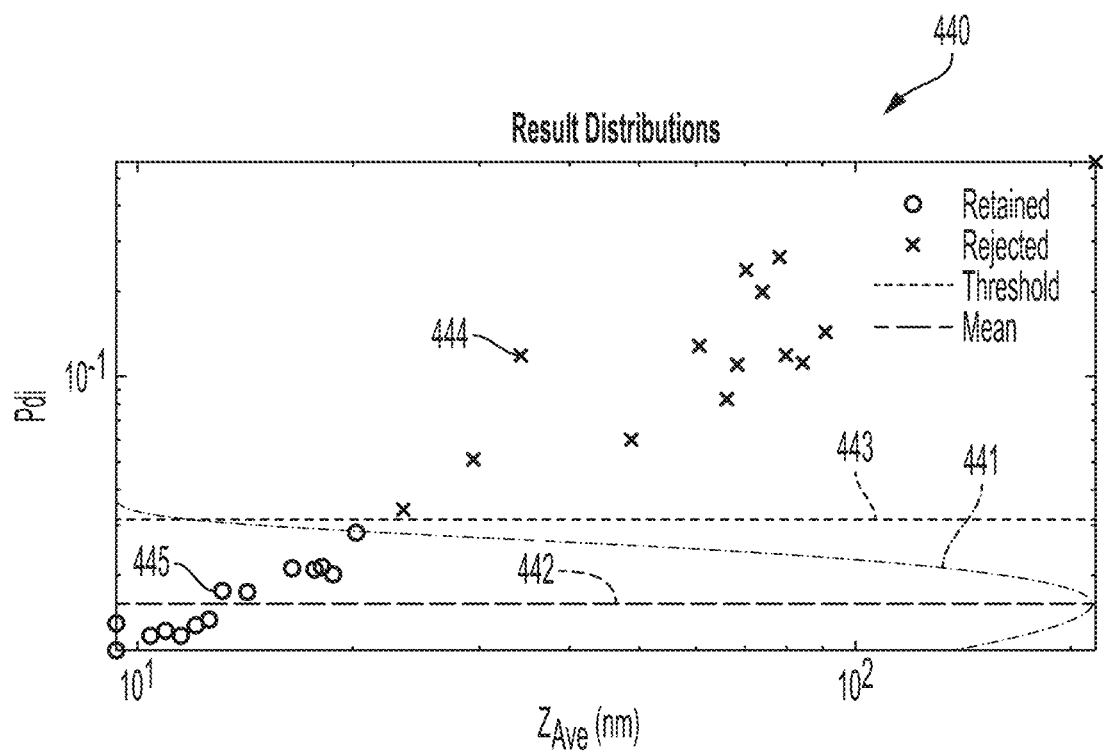
FIG. 10 shows a graph illustrating rejection/segregation criteria for scattering measurements based on polydispersity index.

FIG. 10 illustrates an example rejection approach in which the rejection criteria is based on Pdi, and the threshold is three standard deviations from the average value determined from best fit normal distribution. FIG. 10 shows a graph 440 with the best fit normal distribution 441, the average Pdi 442 (derived from the best fit 441), the threshold rejection criteria 443 (the average+3σ). The retained 445 and rejected/segregated 444 sub-runs are also plotted on the same graph. Sub-runs with Pdi greater than the threshold value are rejected/segregated, and sub-runs with Pdi less than or equal to the threshold value are retained for separate analysis.

Figure 11:
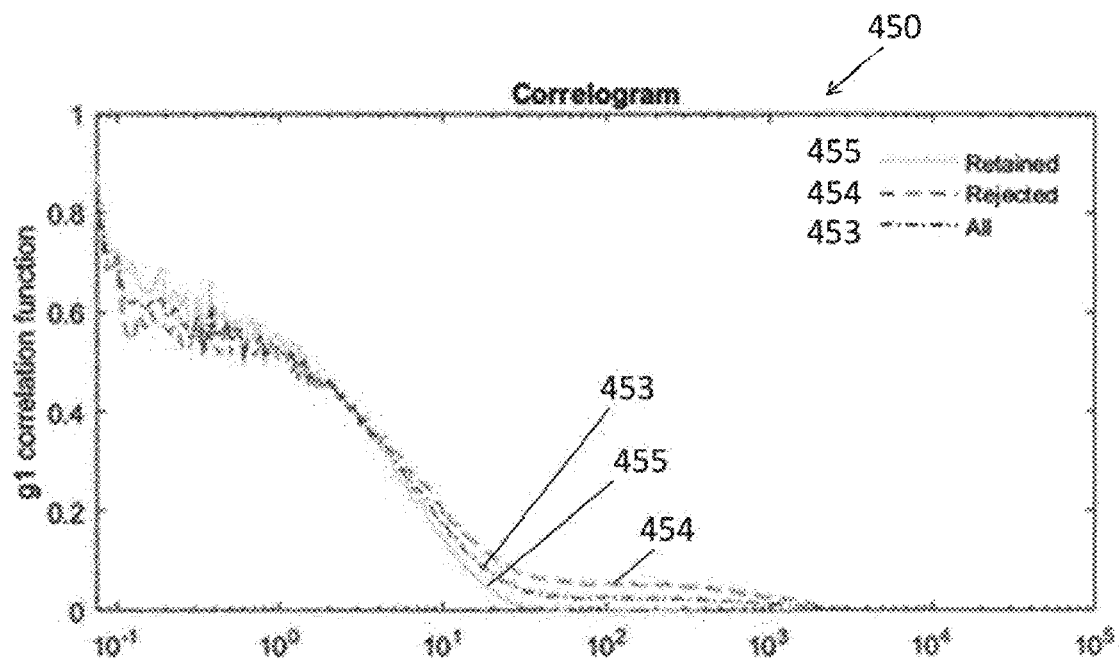
FIG. 11 shows a graph illustrating correlograms for: all scattering measurements, the retained scattering measurements, and the rejected/segregated scattering measurements.
Figure 12:
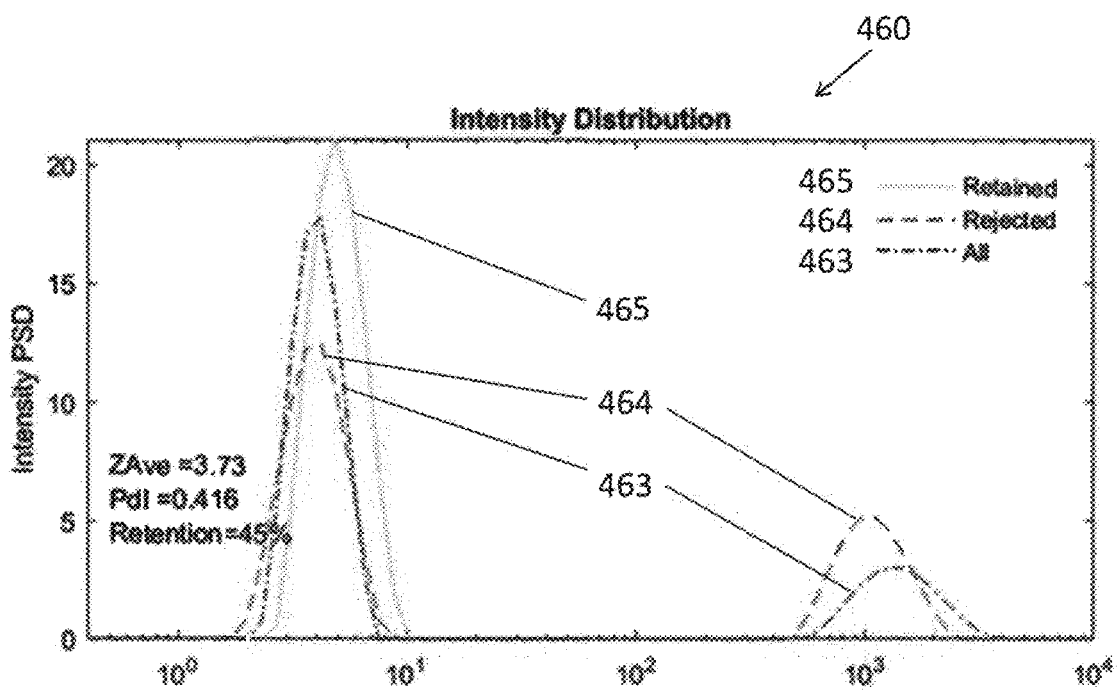
FIG. 12 shows an intensity distribution with respect to particle size for: all scattering measurements, the retained scattering measurements, and the rejected/segregated scattering measurements.

FIG. 11 is a graph 450 showing the g1 correlation function obtained for each of: the retained sub-runs 455, the rejected/segregated sub-runs 454 and all sub-runs 453. FIG. 12 is a graph showing the intensity particle size distribution for each of: the retained sub-runs 465, the rejected/segregated sub-runs 464 and all sub-runs 463. It is clear that the retained sub-runs do not include data from the contaminant particles. The average particle size for the smaller particles (i.e. the particles of interest, excluding the contaminants) that is reported when all the sub-runs are used is different than that obtained from the retained sub-runs. The data from the retained sub-runs is more accurate, because it is not distorted by the scattering from the larger particles/contaminants. The rejected/segregated sub-runs can be used to identify characteristics of the larger (e.g. contaminant) particles. The approach of separately analysing and presenting information about the retained and rejected/segregated sub-runs provides more information to users, and removes ambiguity that may be associated with processing of light scattering data.

The use of a rejection/segregation criteria based on the distribution of a parameter (e.g. based on a standard deviation of a parameter) means that only outlying data is rejected, and that the rejection/segregation is dynamic and responsive to the sample being measured. A highly monodisperse sample with an occasional contaminant will result in a fairly narrow distribution Pdi, with the result that scattering data from contaminants will be rejected with a relatively high degree of sensitivity. At the other end of the spectrum, a highly polydisperse and variable sample may have a high standard deviation in Pdi between successive sub-runs, meaning that very little data will be rejected/segregated—the result will be a multi-modal particle size distribution, reflecting the diversity of particle sizes in the sample. This approach of determining a rejection/segregation criteria that is dynamically responsive to the analysis (e.g. based on a distribution of a parameter that is updated during the measurement) means that the measurement is robust enough to be able to accommodate a broad range of samples, and does not require the user to specify, a priori, an expected range of particles.

Figure 13:
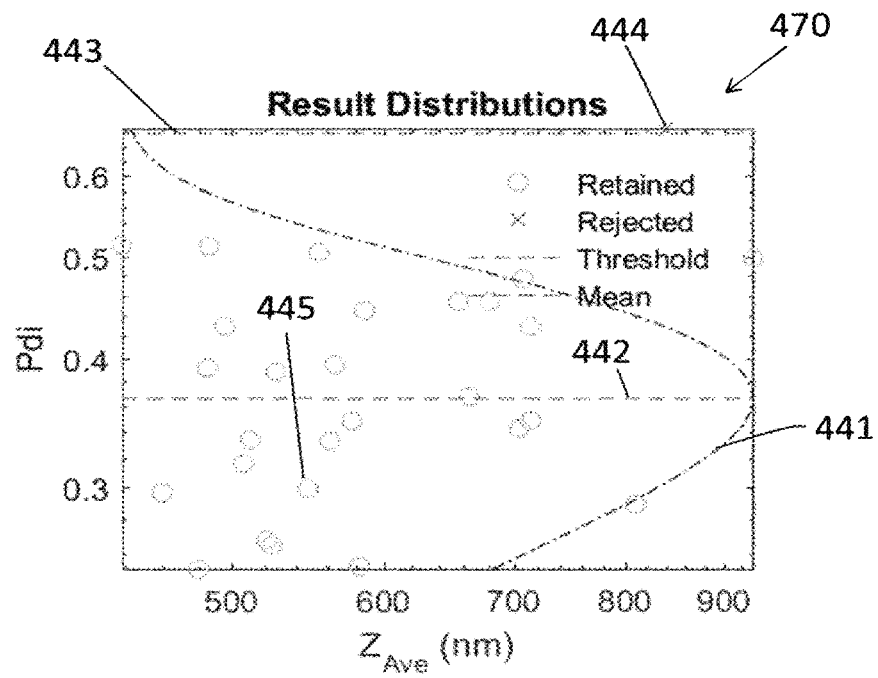
FIG. 13 shows a graph illustrating the application of a polydispersity index based rejection/segregation criteria for scattering measurements in which the sample is highly polydisperse and variable.

FIG. 13 illustrates the rejection/segregation approach shown in FIG. 11, applied to a highly polydisperse and variable sample of Copper Oxide nanoparticles. For this sort of highly variable and disperse sample, a majority of sub runs are identified as non-transient and the result reported reflects the disperse nature of the sample (i.e. multi-modal/polydisperse). FIG. 13 shows a graph 470 with the best fit normal distribution 441, the average Pdi 442 (derived from the best fit 441), the threshold rejection criteria 443 (the average+3σ). The retained 445 and rejected/segregated 444 sub-runs are also plotted on the same graph. Only a single sub-run (with an unusually high Pdi) is rejected/segregated from the data set.

Although the forgoing has mainly focussed on applications in DLS, similar techniques may also be employed for SLS and ELS measurements.

In static light scattering, for applications such as molecular weight measurement, it is the magnitude of the measured scattering intensity rather than its temporal properties that are of interest, meaning that SLS measurements are also susceptible to the effects of dust within a sample.

In SLS instruments that incorporate a correlator, the same rejection process as described in DLS could be applied, and the mean intensity of the retained data used in subsequent analysis. When a correlator is not available however, rejection could still be applied by quantifying and comparing the measured scattering of each sub run, with a mean value, a drift or a spread (or some other value) being used as a rejection parameter.

Figure 15:
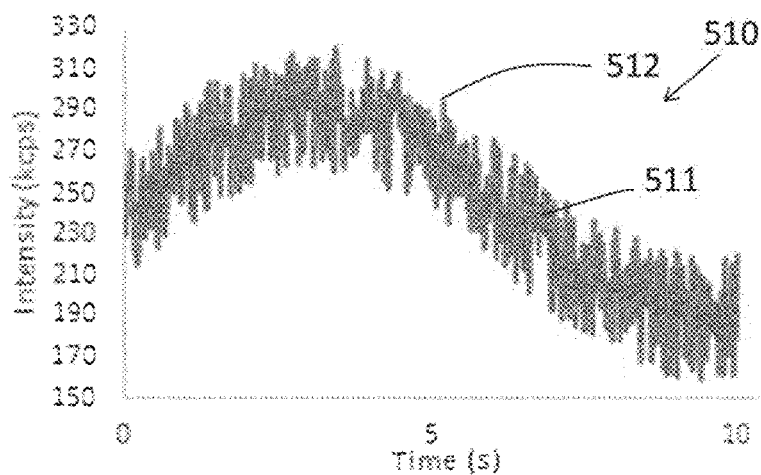
FIG. 15 is a graph of simulated count rate data showing light intensity at a scattering detector and a moving average calculated from the simulated count rate (with a 20 point window)

FIG. 15 illustrates simulated count rate data showing light intensity at a scattering detector 512, a moving average 511 calculated from the light intensity data 512 (e.g. with a 20 point window). The moving average acts as a low-pass filter, tracking the low frequency variation, while filtering out the higher frequency information of interested. Subtracting the moving average 511 from the data 512 results in the data shown in FIG. 16, in which the slow variation in intensity has been removed. Although a moving average is one type of low-pass filter that may be used to process the data, other types of filtering or smoothing operation may be used in a similar way (e.g. a digital IIR or FIR filter, or a Savitzky-Golay filter).

Electrophoretic light scattering uses an external electric field applied to a sample to induce motion in dispersed particles dependent on their charge, with this motion detected through Doppler analysis of scattered light.

As well as properties of the count rate trace, other parameters upon which rejection could be based include parameters describing the Doppler signal including spectral width.

Figure 14:
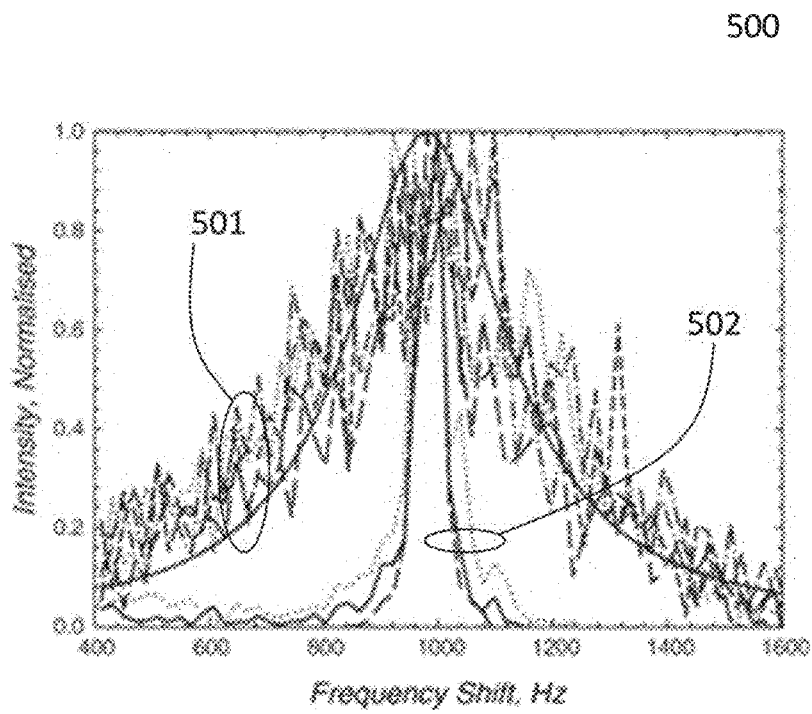
FIG. 14 is a graph or normalised intensity vs frequency shift of scattering light, showing how spectral width can be used to identify and discard outlier data.

FIG. 14 illustrates how spectral width can be used to identify and discard outlier data. The graph 500 of FIG. 14 shows a number of curves of normalised intensity vs frequency shift of scattered light. Each curve corresponds with a different measurement run (or sub-runs) of an electrophoretic measurement on samples comprising Lysozyme. The measurement runs with narrow spectral width 502 correspond with samples in which aggregates are present. The measurement runs with a broader spectral width 501 correspond with samples that do not comprise aggregates. A sample with some aggregates may be therefore analysed by taking a plurality of sub-runs and discarding those with an unusually narrow spectral width (compared with the other measurements), for example based on the distribution of measured spectral widths (e.g. a mean plus or minus a number of standard deviations).

Figure 16:
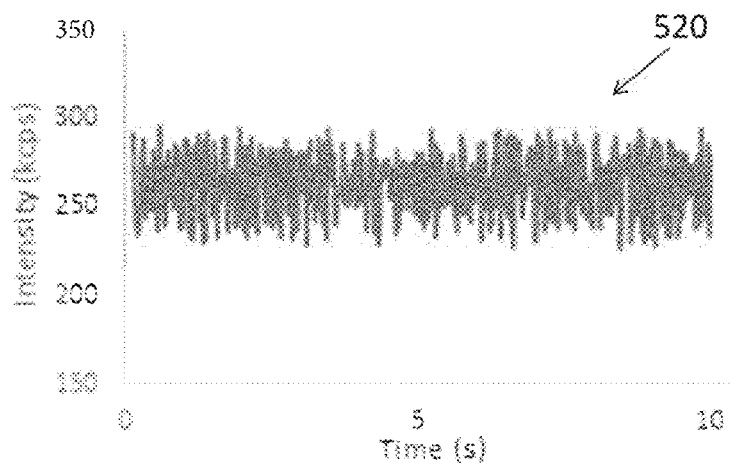
FIG. 16 is a graph of the same simulated count rate data used in FIG. 15, but with the moving average subtracted.
Figure 17:
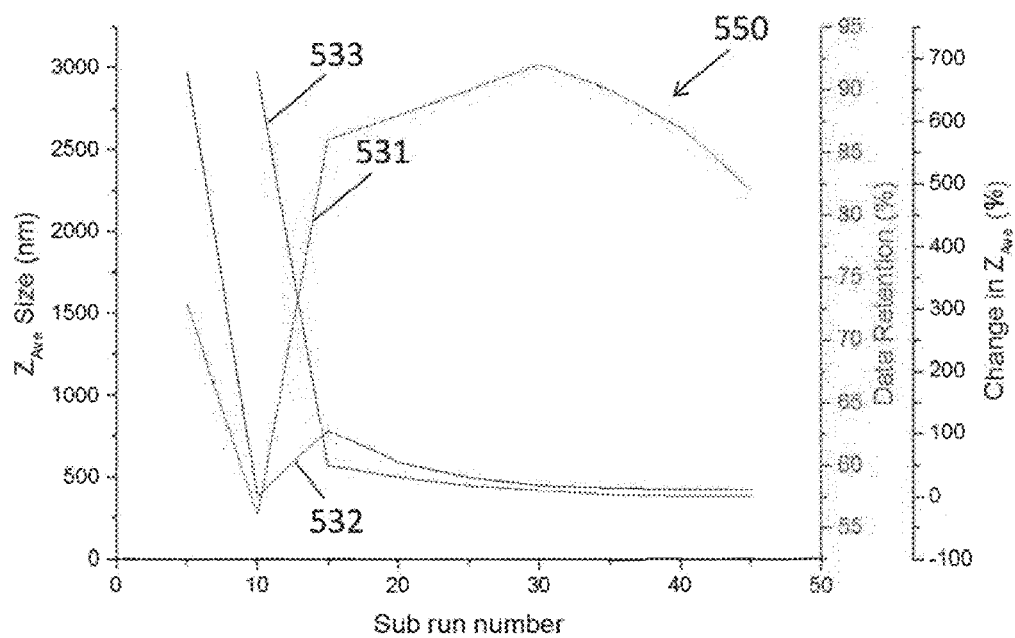
FIG. 17 is a graph illustrating the application of rejection criteria to a highly variable and polydisperse sample, showing the retention of most scattering measurements.

FIG. 17 is a graph 550 illustrating how the results of an analysis may converge with increasing numbers of scattering measurements. Successive scattering measurements were performed, and the reported $Z_{average}$ obtained (updated every five scattering measurements) from the accumulated retained data is plotted 532 in FIG. 16 on the primary y-axis (against the number of scattering measurements on the x-axis). The data retention percentage, defined as the percentage of rejected/segregated scattering measurements compared with the total number of scattering measurements, is plotted 531 with respect to the first secondary y-axis (also determined every five scattering measurements). The change in $Z_{average}$ at each data point is plotted 533 with respect to the second secondary y-axis.

In this example data-set, the initial scattering measurements include larger particles, while a significant amount of data is excluded from the first 5 scattering measurements, the reported $Z_{average}$ is still relatively large. Even more data is excluded in scattering measurements 6 to 10, and the reported $Z_{average}$ is lower. A more mono-modal distribution of particle sizes is detected after scattering measurement 10, with the result that less data is rejected, and the $Z_{average}$ begins to converge on the $Z_{average}$ for the mono-modal particle (which is likely to be the particle of interest). The $Z_{average}$ is converged to less than 1% within 45 scattering measurements.

The user may be able to set a convergence criteria for triggering the end of a measurement. In the present example a less reliable measurement can be obtained by setting a $Z_{average}$ convergence tolerance of 10%, which may result in the measurement ending after around 30 scattering measurements (rather than 45 scattering measurements).

The use of a series of separately analysed, relatively short, scattering measurements mean that the analysis can be faster, because it can be stopped early when a convergence criteria is met, at the same time as being more reliable, since transient large particles will not be allowed to impact the measurement, and the measurement may continue until sufficient reliable scattering data is obtained. The improved ability to reject inconsistent data may also allow less stringent sample preparation, or enable the analysis of samples that were previously regarded as unsuitable for analysis.

In many applications, scattered light is detected with an avalanche photodiode or similar photon counting device, from which a precise time of arrival of each photon pulse can be recorded. The result is a series of time measurements, each associated with a photon arrival at the detector. In order to obtain a count rate signal, it is necessary to process the raw time series of photon arrivals, by binning the arrival times in bins corresponding with time intervals, with count rate determined from the number of photons in the bin (divided by the bin width). The bin size determines the temporal resolution of the count rate signal—there is a trade-off between the resolution of quantisation within each bin and the temporal resolution. A smaller bin size will provide a greater temporal resolution, but will include a relatively small number of photons, limiting quantisation resolution. A larger bin will include more photons, but will lead to fine temporal structure being discarded.

Figure 18:
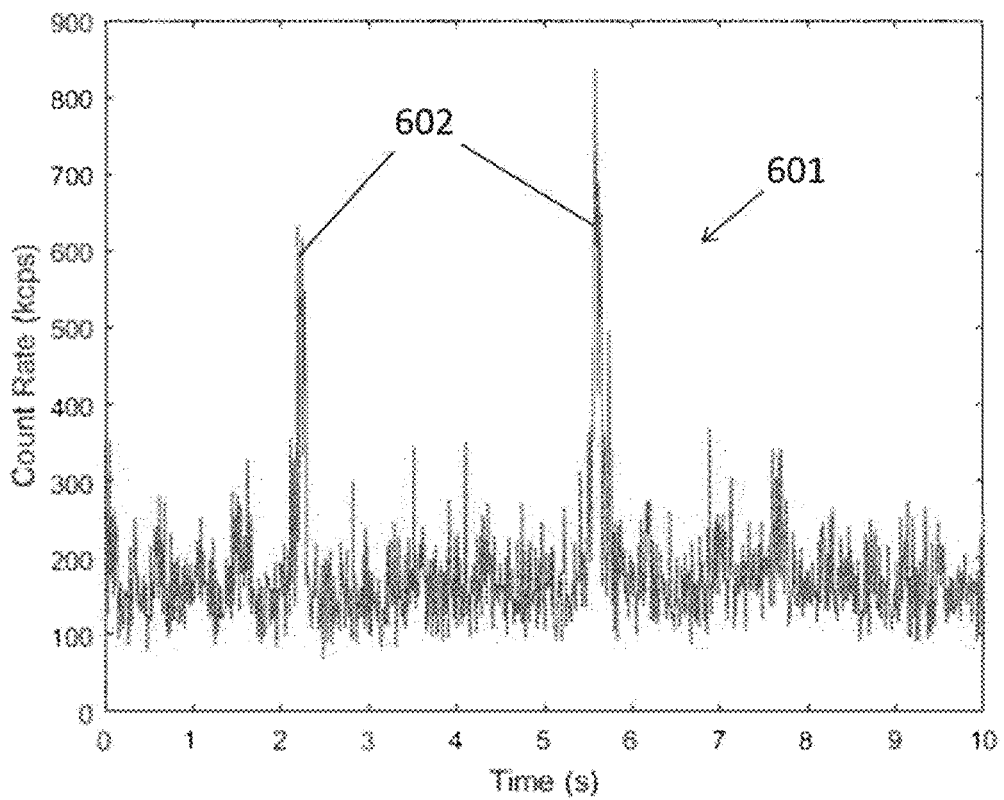
FIG. 18 is a graph of count rate of scattered light from a contaminated sample.

FIG. 18 show a count rate trace 601, showing thousands of counts per second (kcps) against time (s) for a 220 nm latex suspension containing filter spoil. Peaks 602 are visible in the trace, which correspond with scattering from contaminants (filter spoil in this case). The peaks 602 have a relatively low frequency, and a high scattering intensity.

One way to correct the count rate trace to correct scattering measurement is to high-pass filter the count rate. This will have the effect of removing low frequency components, so will tend to remove a scattering contribution from contaminants. Any suitable filter may be used, and the filter may be implemented electronically or digitally. Examples of suitable filters include FTIR and IIR digital filters, and Butterworth, Chebyshev and Hanning window filters.

Determining an arbitrary cut-off frequency for the filter that fits all measurement circumstances may be difficult, because the size range of particles that can be measured with typical light scattering techniques may be very broad. A fixed cut-off frequency that is too low may adversely affect the ability of the method to analyse large particles, and a fixed cut-off frequency that is too high may limit the accuracy of the method in characterising monomodal small particles.

A solution to this problem is to dynamically determine a cut-off frequency for a filtering operation on the scattering measurement. One way to do this is to divide the scattering measurement into a series of shorter sub-runs (or to put it another way, to take a plurality of scattering measurements), and analyse the power (or amplitude) at a number of different frequencies for each sub-run (e.g. by performing a Fourier transform on a count rate for each sub-run).

Frequencies that include a scattering contribution from contaminants may be defined as those which include sub-runs with powers that are outliers from the distribution of the powers of the rest of the sub-runs. For example for each frequency, an average power level, and a standard deviation may be determined from the power levels in each sub-run. If a particular frequency includes a power level that is more than a predetermined multiple of standard deviations from the average value (e.g. two or three standard deviations), that frequency may be identified as including a scattering contribution from a contaminant. The lowest frequency that does not include a scattering contribution from a contaminant may be used as the cut-off frequency for a filtering operation on the scattering measurement.

Figure 19:
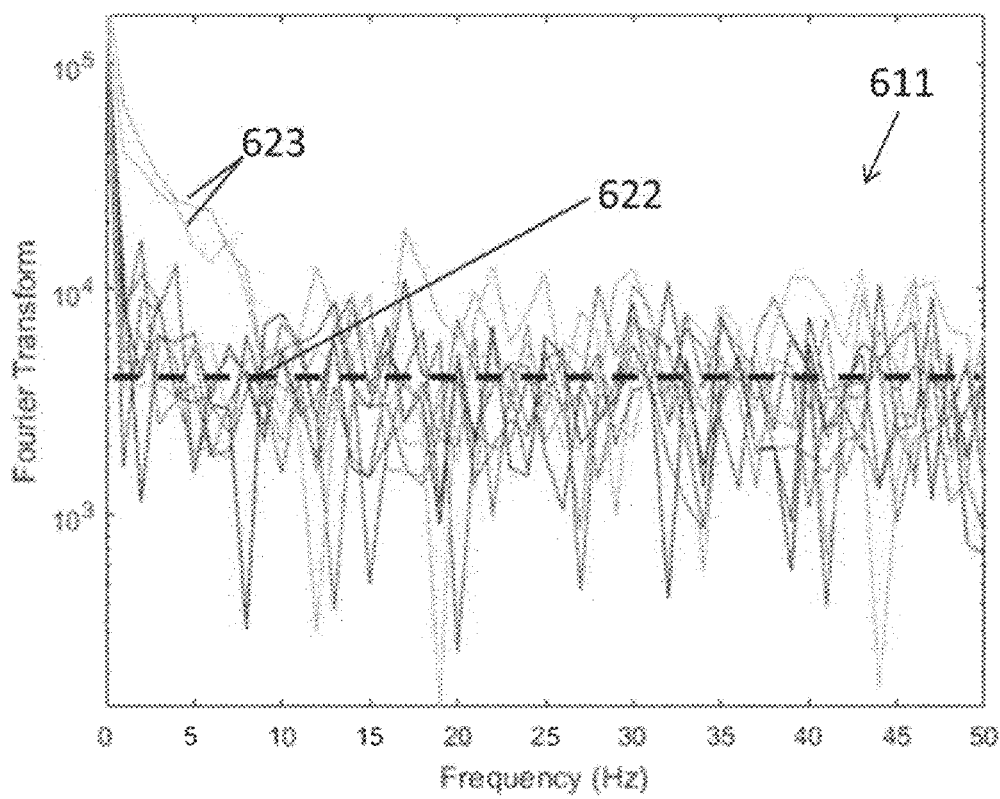
FIG. 19 is a set of Fourier transforms, showing the spectral power in periods of the count rate shown in FIG. 18.

FIG. 19 illustrates this, showing Fourier transforms 611 obtained by splitting the scattering measurement shown in FIG. 18 into 10 runs of 1 second each. Two of the runs 623 are obvious statistical outliers at frequencies below 10 Hz (i.e. 2-3 seconds and 5-6 seconds). Accordingly, the dynamic cut-off frequency may be determined as 10 Hz, and the scattering measurement filtered appropriately.

An alternative method of correcting the scattering data is to subtract a low-pass or smoothed version of the data (as already discussed with reference to FIGS. 15 and 16). The method described above for determining a dynamic cut-off frequency may be applied to determine appropriate smoothing or low-pass filtering characteristics for this purpose.

Figure 20:
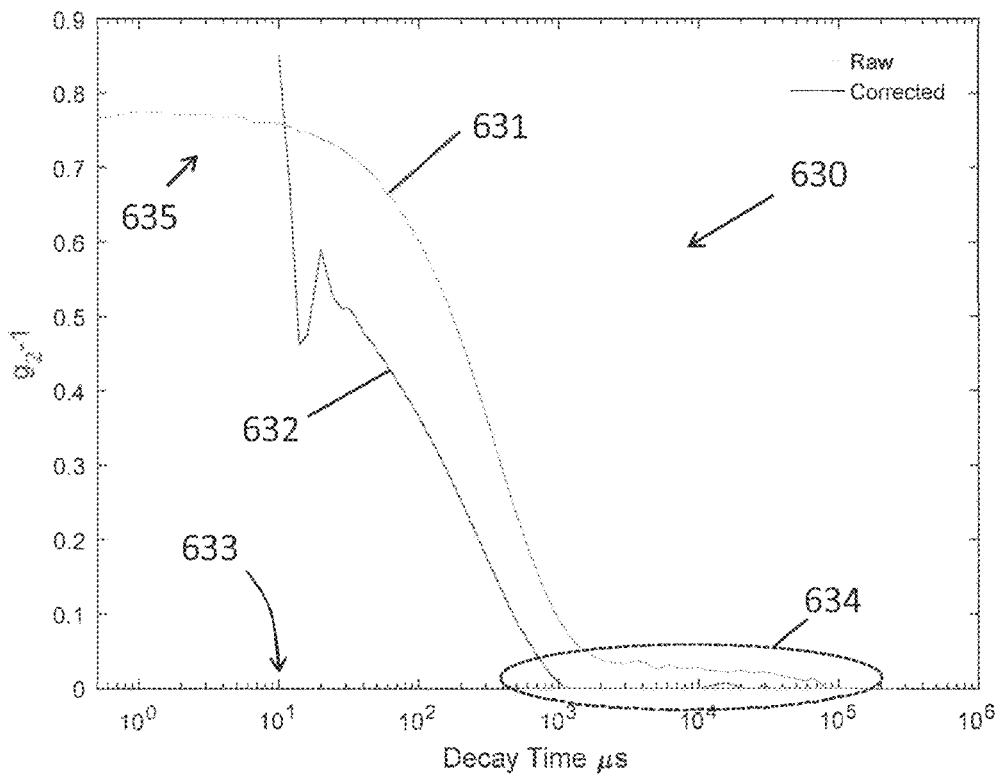
FIG. 20 is a graph of a raw autocorrelation function obtained from the raw data used to produce FIG. 18, and a corrected autocorrelation function obtained from a filtered version of the (binned) photon count rate shown in FIG. 18.

Referring to FIG. 20, a plot 630 of autocorrelation functions obtained from raw scattering measurements 631 and corrected scattering measurements 632 is shown. The raw data in this case comprises a series of photon arrival times, and the corrected scattering measurement from which the corrected autocorrelation function was determined comprises a binned count rate which has been corrected (e.g. by filtering or subtracting a filtered/smoothed version of the count rate). In this example the bin size 633 was 10 micro-seconds, with the result that decay times less than (and near to) 10 microseconds cannot be resolved. Although the correction has successfully removed the noise on the baseline of the autocorrelation function (at long delay times), it results in an autocorrelation function that is not resolved at short delay times.

Figure 21:
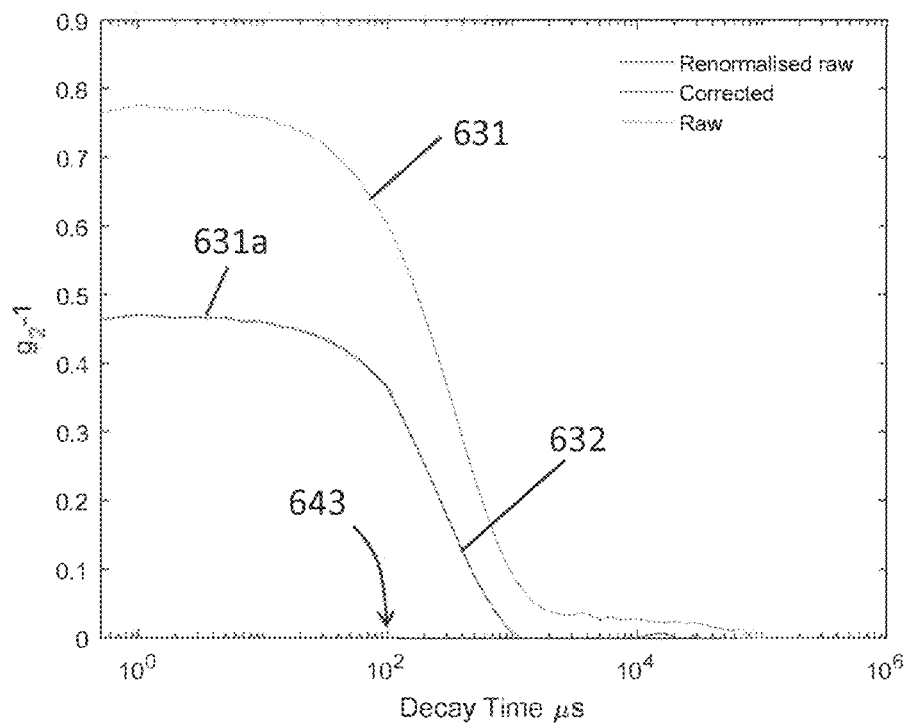
FIG. 21 is a graph of a composite autocorrelation function obtained by combining part of the corrected autocorrelation function of FIG. 20 with a re-normalised version of the raw autocorrelation function.

At short delay times, the autocorrelation function obtained from the raw data is largely unaffected by contaminants. In order to maintain the advantages of both the corrected and raw autocorrelation functions, a composite autocorrelation function may be determined by combining a portion of the raw autocorrelation function 632 (corresponding with short decay times) with a portion of the corrected autocorrelation function 631a (corresponding with longer decay times), as shown in FIG. 21

The cut-off decay time that marks the boundary between the raw and corrected portions of the corrected autocorrelation function may be selected from the range of 50-250 micro-seconds. The raw autocorrelation function may be re-normalised so that the value of the raw autocorrelation function matches that of the corrected autocorrelation function at the cut-off decay time, as shown in FIG. 21.

As an alternative to selecting a fixed cut-off decay time, a cut-off decay time may be selected that minimises a gradient change at the transition between the raw and corrected portion of the composite autocorrelation function. An iterative method may be used to determine an optimal cut-off delay time for the transition between the raw and corrected autocorrelation function.

Figure 22:
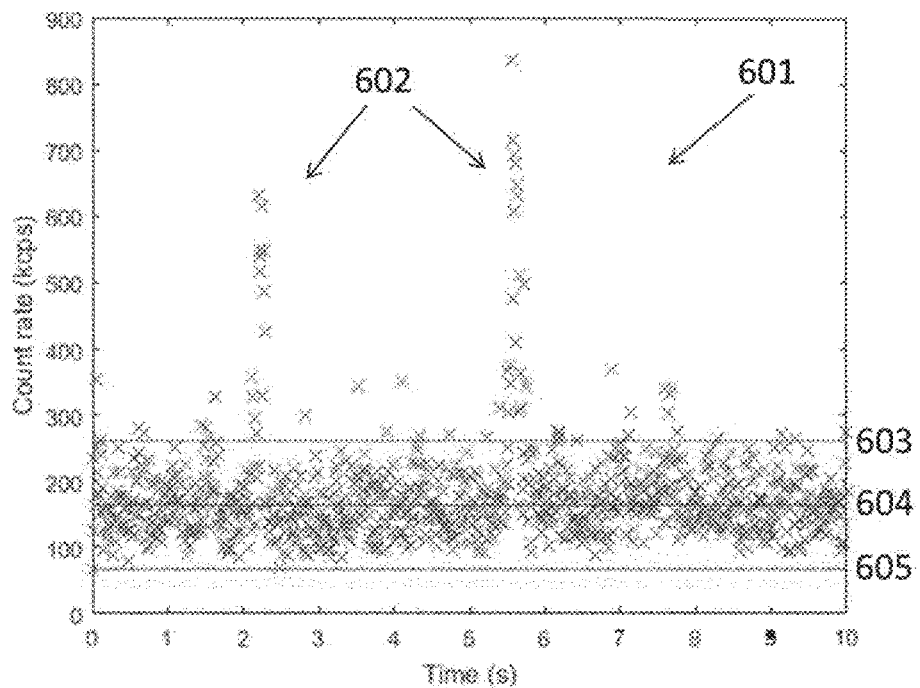
FIG. 22 is a graph showing using a threshold intensity criteria to select bins for correction from the count rate signal previously shown in FIG. 18.

It is possible to directly correct a scattering measurement when it is in the form of a series of photon arrivals times by deleting photon arrivals to reduce the effective scattering intensity at relevant times. FIG. 22 is a graph showing the same scattering count rate 601 previously illustrated in FIG.

18, but further including an average count rate 604 (in this case a median, but a mean or mode could also be used). The lowest count rate 605 is also indicated, and an upper limit 603 for non-contaminated scattering is indicated. The upper limit 603 is calculated from the scattering count rate, in this case being the average 604 plus the difference between the average 604 and the minimum count rate 605. In other embodiments a different criteria may be used to define an upper limit 603 for the normal count rate (e.g. average plus n standard deviations). Bins 602 that are outside the upper limit 603 are indicated. These bins have been identified as contaminated bins (i.e. including a scattering contribution from contaminants).

Figure 23:
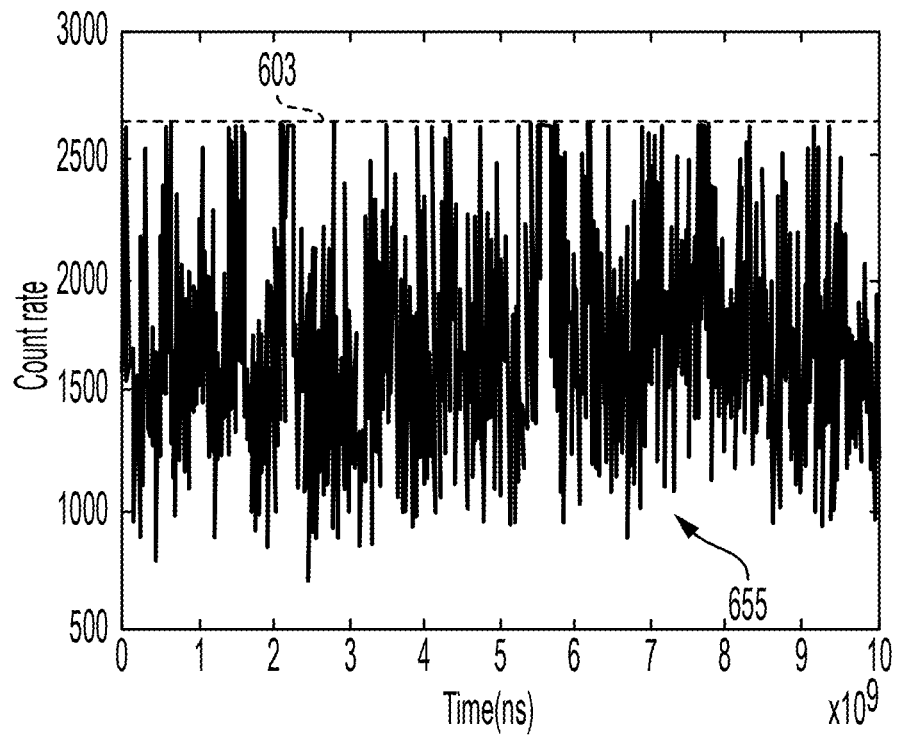
FIG. 23 is a graph showing the corrected count rate signal, after the correction threshold shown in FIG. 22 has been applied.

For each contaminated bin 602, an excess number of counts may be determined by subtracting the count rate in the contaminated bin from the upper limit 603. A number of photon arrival events equal to the excess number of counts can subsequently be deleted from each contaminated bin, for example by selecting recorded photon pulses for deletion from that bin at random. FIG. 23 illustrates the resulting corrected count rate trace 655, which has been limited not to exceed the upper limit of intensity 603 in each bin.

In some embodiments, the amount of counts to be deleted from each bin may be selected with a degree of randomness, to avoid the hard limit on the photon count per bin that is visible in FIG. 23. For example, a number of photons may be selected for deletion based on a random number between the excess number of photons in each bin and a maximum number of photons to be deleted. Alternatively or additionally, an additional random photons above the excess number of photons may be deleted iteratively until the statistics of the spread of counts per bun meets some quality metric (e.g. a Poisson distribution test).

Figure 24:
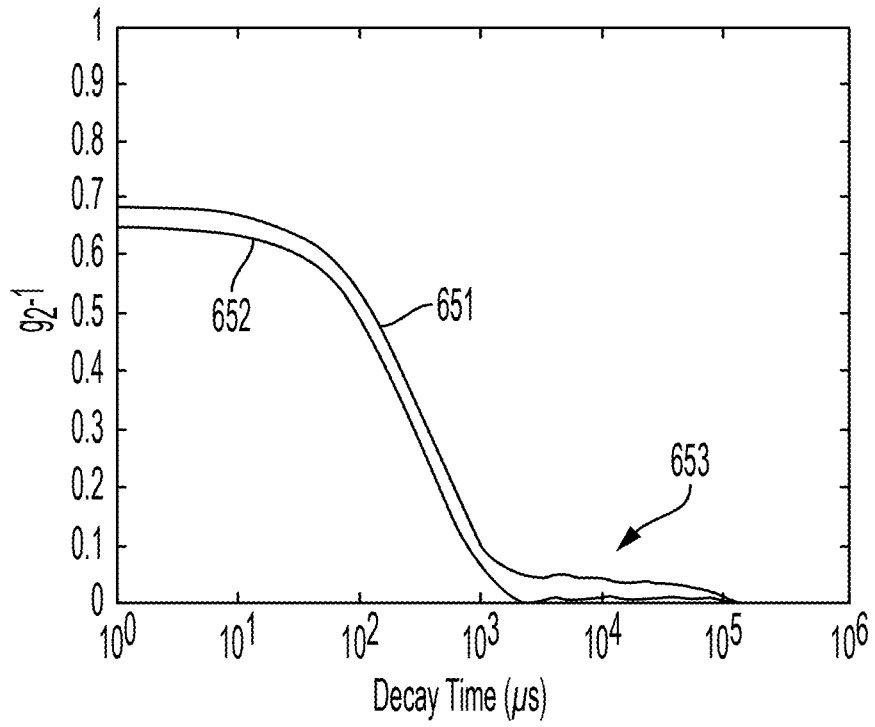
FIG. 24 is a comparison of a raw autocorrelation function with a corrected autocorrelation function obtained from adjusted measurement data in which a correction for scattering from contaminants was applied by discarding photon arrival times.

FIG. 24 shows the autocorrelation function of the raw scattering measurement 651 and the autocorrelation function of the corrected scattering measurement 652. The corrected autocorrelation function has a much lower baseline, but retains information at low decay times that would be adversely affected by correcting a scattering measurement after binning.

Performing a cumulants analysis on the raw autocorrelation function 651 results in a reported $Z_{average}$ of 451 nm. Performing a cumulants analysis on the corrected autocorrelation function 652 results in a reported $Z_{average}$ of 247 nm. The latter figure is in excellent agreement with an cumulants analysis performed on a rigorously filtered sample, which gave a $Z_{average}$ of 242 nm.

This technique of discarding photon arrival times can be adapted to correct the scattering data based on more complex criteria than a simple upper limit to scattering intensity. For example, a model of a scattering contribution may be subtracted from the raw count rate timing data: e.g. the smoothed count rate 511 from FIG. 15 could be used to define a number of counts for removal from each bin of the raw photon arrival time scattering measurement. This sort of correction enables a corrected scattering measurement to be produced directly from the raw scattering measurement without first binning the scattering measurement.

Figure 25:
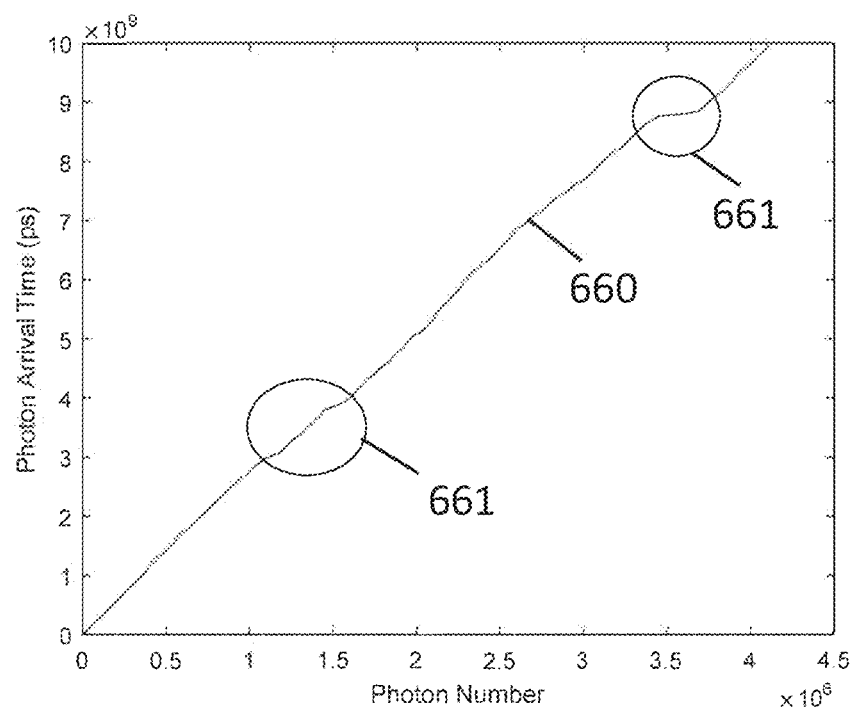
FIG. 25 is a graph illustrating how the gradient of photon arrival time vs photon number can be used to identify scattering from contaminants.

The raw sequence of photon arrival times may also be directly processed to identify scattering contributions from contaminants. Instead of identifying high count rates after binning, the gradient of photon count against photon arrival time can be used to identify high intensity portions of the scattering measurement. FIG. 25 shows a plot of photon number against photon arrival time 660 for 500 nm latex spheres dispersed in water. The circled regions 661 indicate changes in gradient that correspond with a scattering contribution from contaminants. Such regions may be identified by comparing the local gradient of the count rate trace with an average gradient for the whole measurement.

Figure 26:
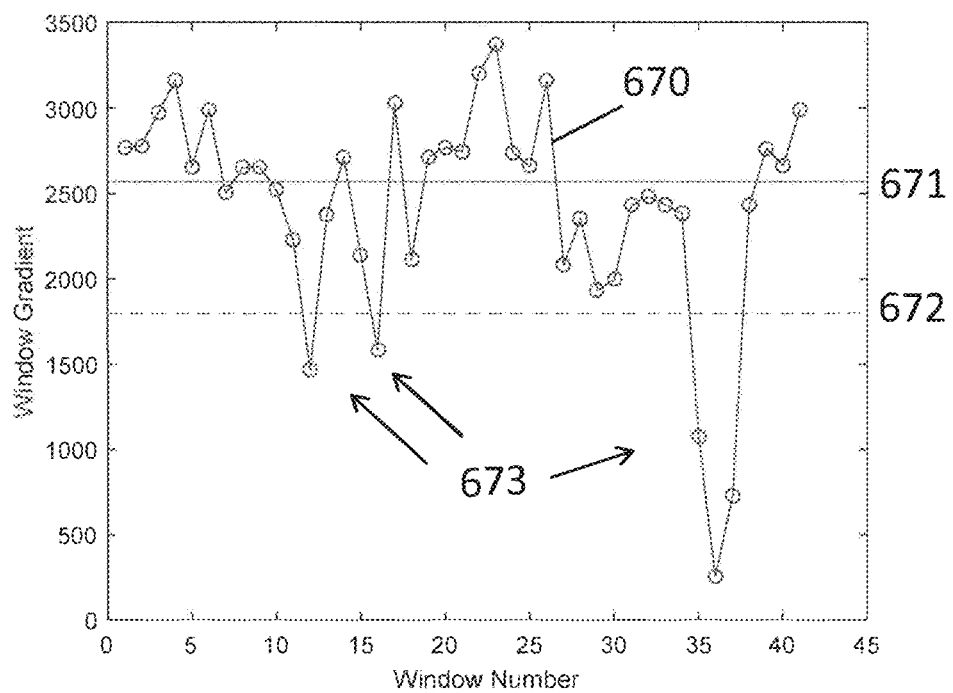
FIG. 26 is a graph illustrating the identification of an optimal measurement period by identifying windows of a scattering signal that comprise contaminant scattering.

FIG. 26 illustrates this process, showing an average gradient 671 and the calculated gradient 670 for each of a plurality of windows. The windows may be defined based on a fixed number of photon arrivals, or based on a fixed time. A gradient threshold 672 is defined as a percentage of the average gradient (in this case 70%). This results in 5 windows 673 being identified as contaminated.

This process may be used to identify portions of the raw count rate trace that do not include a scattering contribution from contaminants. In the illustrated example, a central portion of the scattering measurement (between the first and second circled regions 661 in FIG. 25) is the longest continuous portion of the scattering measurement that is not contaminated. The longest uncontaminated portion may be used as a basis for determining a characteristic of a particle (e.g. a particle size or particle size distribution).

A smaller window size will result in more sensitive identification of scattering contributions from contaminants, and a larger window size will tend to be less sensitive. The window size may be adjusted to suit the properties of the sample (e.g. based on statistical properties of the scattering measurement).

Figure 27:
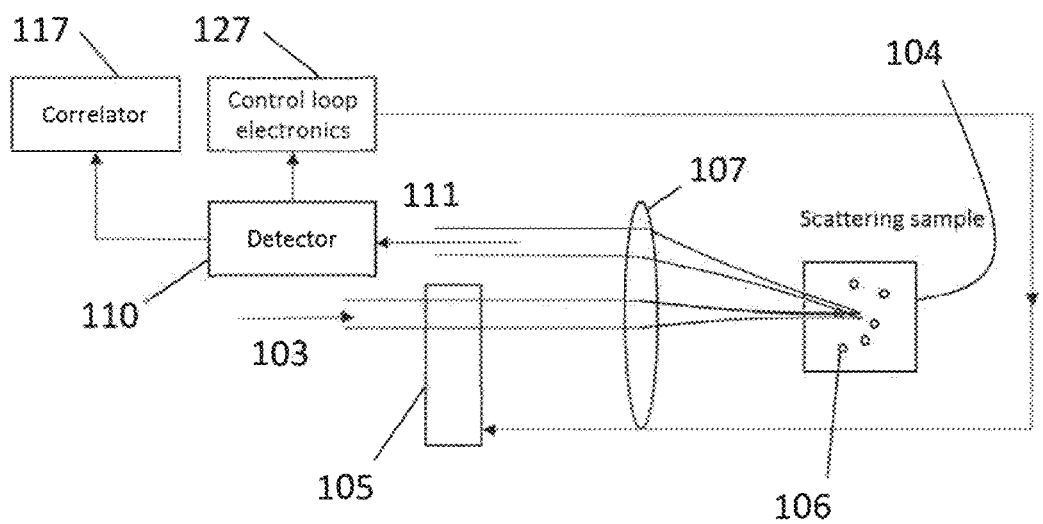
FIGS. 27 to 29 are schematic diagrams of apparatus in which compensation for scattering from contaminants is performed in the optical domain, with an optical attenuator.
Figure 28:
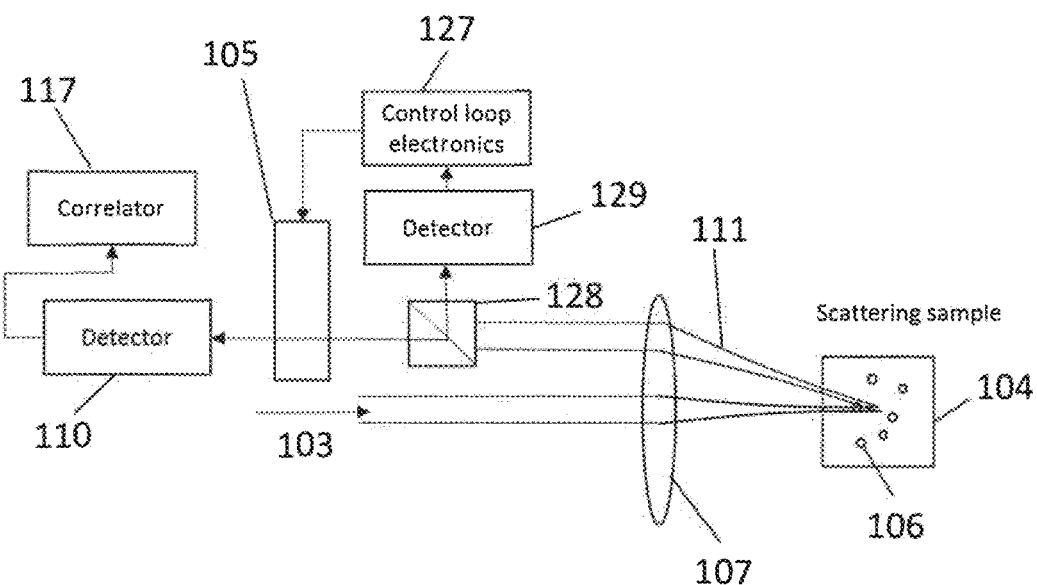
Figure 29:
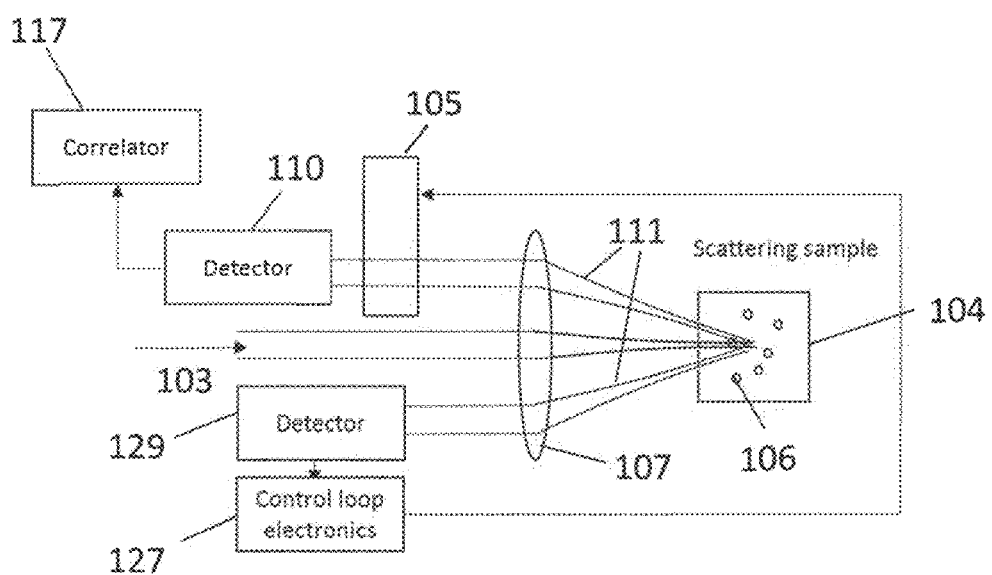

As mentioned above, modifying the count rate may be considered analogous to attenuating the optical signal (e.g. with an attenuator, in the optical domain). FIGS. 27 to 29 illustrate example embodiments in which features of the methods described herein are implemented in the optical domain.

Referring to FIGS. 27 to 29, an apparatus for particle characterisation is shown, comprising a variable attenuator 105, focussing lens 107, sample cell 104, detector 110, correlator 117 and control electronics 127.

In each of FIGS. 27 to 29 a sample 106 comprising particles suspended in a diluent fluid is within the sample cell 104. An illuminating light beam 103 from a light source (not shown) illuminates the sample 106, so as to produce scattered light 111. The light beam 103 is focussed within the sample cell 104 by a focussing lens 107 (which may be moveable, so as to alter the detection region within the cell). The scattered light 111 is received by the detector 111 via a detection optical path with passes through the focussing lens 107. The detector 110 may be a photo counting detector, such as an avalanche photodiode or similar. The output from the detector 110 is provided to a correlator, for example for performing a DLS analysis or similar. It is not essential for both the illuminating light beam and the scattered light to pass through the same focussing lens: any appropriate optical arrangement may be used to direct the detection optical path to overlap with the light beam. For example, in some circumstances the light beam and/or detector optical path may be collimated or diverging.

In the example of FIG. 27, the output from the detector 110 is provided to control electronics 127, which is configured to detect a scattering contribution from contaminants in the scattered light at the detector. The control electronics may embody any of the methods described herein to detect scattering contributions from contaminants. One example is that the control electronics may comprise a low pass filter. The control electronics may provide a control signal that is proportional to a scattering contribution from contaminants to the variable attenuator, which attenuates the illumination beam to compensate for the scattering from contaminants.

FIG. 28 illustrates an alternative apparatus for particle characterisation, further comprising a beam splitter 128 and further detector 129.

In this apparatus the beam splitter is arranged to provide a portion of the scattered light 111 to the further detector 129. The control electronics 127 is configured to detect a scattering contribution from contaminants in the scattered light at the further detector 129. Again, the control electronics may embody any of the methods described herein to detect scattering contributions from contaminants. One example is that the control electronics may comprise a low pass filter. The control electronics may provide a control signal that is proportional to a scattering contribution from contaminants to the variable attenuator, which attenuates the scattering light received by the detector 110, to compensate for the scattering from contaminants.

FIG. 29 illustrates a further alternative apparatus, which is similar to that of FIG. 28 (in that a further detector 129 is used to provide the signal to the control electronics), but which omits the beam splitter. The scattered light 111 detected by the further detector 129 in this embodiment is scattered in a different direction to the scattered light that is ultimately received at the detector 110. The scattering angle for the detector 110 and the further detector 129 may preferably be substantially the same, but this is not essential. The further detector 129 may be at a different scattering angle (e.g. detecting forward scatter, with a back scatter detector 110).

The variable attenuator 105 in any embodiment may comprise a variable neutral density filter, mounted on a translation stage (e.g. comprising a stepper motor or piezoelectric transducer. Alternatively, the attenuation may be varied using the polarisation of the light within the system (the illumination light beam may be polarised, and the scattered light may retain this polarisation, to at least some degree). A variable attenuator on these principles may comprise tuneable crossed polarisers, a single polariser and a Pockels cell, a Faraday rotor, a combination of a fixed and fibre polariser, a variable wave plate and/or liquid crystal elements.

Each of these methods will have its own associated response time, but typical time scales of slow variation in count rate would be within the realms of each of these techniques, whereas optoelectronic methods would have a greater ability to respond to spikes in count rate.

Whereas many commercial lab instruments may be treated as a "black box", the user of particle characterisation technologies (such as DLS) may benefit from clear and relevant information on the quality of their sample and its suitability for a given analysis method. The techniques described herein could therefore be used to present information to the user about scattering contributions due to contaminants. For example, a raw photon count rate and a modified version could be presented to the user (e.g. as per FIG. 16). Similarly, any other relevant data sets may be shown before and after processing e.g. presentation of raw and corrected autocorrelation functions for DLS (e.g. as in FIG. 24) and phase or frequency plots for ELS and MLS, and traces used in the processing of the data (e.g. the spectra of FIG. 19 or the windowed gradient in FIG. 26).

Comparison of the outcome of these methods (or an ideal signal) and the initial raw signal could also be used to give a quantitative measure of sample suitability rather than a purely qualitative one. For example, the sum of residuals between a raw count rate containing spikes or slow variation and a straight line at the mean count rate would be much larger than that calculated for a stable count rate.

These parameters could be used simply as a metric which is reported to a user, or as an additional parameter within a neural network to characterise the quality of a measurement.

The examples described in detail herein have tended to focus on the context of dynamic light scattering measurements, but it will be understood that the same concepts may be directly applied to other types of light scattering measurements, mutatis mutandis. For example, although the measurement results described herein are intensity based, in some embodiments a light scattering measurement may be based on heterodyne detection, with a modulated reference (or scattering) beam. In that case the amplitude of the envelope of the modulated detector signal may be the measurement parameter (rather than the intensity of scattered light), and the methods described herein may be modified accordingly. Similarly, the method described herein can readily be adapted to process PALS (phase angle light scattering) to reduce the effect of contaminants on zeta potential measurements.

Although specific examples have been described, these are not intended to be limiting, and the skilled person will understand that further variations are possible, within the scope of the invention, which is defined by the appended claims.

The invention claimed is:

1. A method of characterising particles in a sample, comprising:
obtaining a scattering measurement comprising a time series of measurements of scattered light from a detector, the scattered light produced by the interaction of an illuminating light beam with the sample;
producing a corrected scattering measurement, comprising compensating for scattering contributions from contaminants by reducing a scattering intensity in at least some time periods of the scattering measurement;
determining a particle characteristic from the corrected scattering measurement,
wherein reducing the scattering intensity comprises determining a model of scattering contributions from contaminants, and then subtracting the model from the scattering measurement.

2. The method of claim 1, wherein reducing the scattering intensity comprises modifying a recorded scattering measurement.

3. The method of claim 1, wherein the model comprises low-pass filtered version of the scattering measurement.

4. The method of claim 3, wherein the low-pass filtered version comprises a moving average or a Savitsky Golay filter.

5. The method of claim 1, wherein the model comprises a smoothed version of the scattering measurement.

6. The method of claim 5, wherein the operation comprises a moving average or a Savitsky Golay filter.

7. The method of claim 1, wherein the model comprises a fit to the scattering measurement.

8. The method of claim 1, wherein producing a corrected scattering measurement comprises producing a composite autocorrelation function by combining part of a raw autocorrelation function derived from the uncorrected scattering measurement with part of an adjusted autocorrelation function derived from an adjusted scattering measurement, in which scattering intensity in at least one time period has been reduced to compensate for scattering contributions from contaminants.

9. The method of claim 8, wherein the part of the raw autocorrelation function corresponds with delay times that are shorter than or equal to a selected delay time, and the part of the adjusted autocorrelation function corresponds with delay times that are longer than or equal to the selected delay time.

10. The method of claim 9, comprising normalising the raw autocorrelation function so that the composite autocorrelation function is continuous at the selected delay time.

11. The method of claim 9, wherein the selected delay time is in the range of 50 to 200 micro-seconds.

12. The method of claim 9, wherein the selected delay time is determined to cause the gradient of a linear region of the raw autocorrelation function to match a gradient of the same linear region of the adjusted autocorrelation function at the selected delay time.

13. The method of claim 1, wherein the scattering measurement comprises a sequence of photon pulses, and reducing the scattering intensity comprises deleting photon pulses from the sequence.

14. The method of claim 13, wherein deleting photon pulses from the sequence comprises binning the sequence of photon pulses, and correcting selected bins by deleting a number of photon pulses from each selected bin.

15. The method of claim 14, wherein the model comprises an estimate of the number of photon pulses in each bin due to scattering from a contaminant, and correcting the selected bins comprises deleting a number of photon pulses based on the estimate for each selected bin.

16. An apparatus for characterising particles, comprising: a light source, a sample cell, a detector and a processor; wherein
   the light source is operable to illuminate a sample within the sample cell with a light beam so as to produce scattered light by interactions of the light beam with the sample;
   the detector is configured to detect the scattered light and produce a time series of measurements; and
   the processor is configured to:
   obtain a scattering measurement comprising a time series of measurements of the scattered light from the detector;
   produce a corrected scattering measurement, comprising compensating for scattering contributions from contaminants by reducing a scattering intensity in at least some time periods of the scattering measurement;
   determine a particle characteristic from the corrected scattering measurement, wherein reducing the scattering intensity comprises determining a model of scattering contributions from contaminants, and then subtracting the model from the scattering measurement.

* * * * *